United States Patent
Wang

(10) Patent No.: US 10,528,012 B2
(45) Date of Patent: Jan. 7, 2020

(54) METHOD AND DEVICE FOR SENDING COMMUNICATION MESSAGE

(71) Applicant: TENCENT TECHNOLOGY (SHENZHEN) COMPANY LIMITED, Shenzhen (CN)

(72) Inventor: Sheng Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 15/456,743

(22) Filed: Mar. 13, 2017

(65) Prior Publication Data

US 2017/0185052 A1 Jun. 29, 2017

Related U.S. Application Data

(63) Continuation of application No. PCT/CN2016/079303, filed on Apr. 14, 2016.

(30) Foreign Application Priority Data

May 28, 2015 (CN) .......................... 2015 1 0284411

(51) Int. Cl.
*G04R 20/14* (2013.01)
*G04G 21/06* (2010.01)
(Continued)

(52) U.S. Cl.
CPC ............. *G04R 20/14* (2013.01); *G04G 21/06* (2013.01); *G06Q 20/322* (2013.01);
(Continued)

(58) Field of Classification Search
USPC .................................... 455/41.1, 41.2, 575.6
See application file for complete search history.

(56) References Cited

U.S. PATENT DOCUMENTS 9,408,048 B1 * 8/2016 Paulrajan ................ H04W 4/12
2009/0048044 A1 * 2/2009 Oleson ............... A63B 24/0062
473/570

(Continued)

FOREIGN PATENT DOCUMENTS

CN 104159206 A 11/2014
CN 104243561 A 12/2014
(Continued)

OTHER PUBLICATIONS

The World Intellectual Property Organization (WIPO) International Search Report for PCT/CN2016/079303 dated Jul. 13, 2016 5 Pages.

(Continued)

*Primary Examiner* — Yuwen Pan
*Assistant Examiner* — Erica L Fleming-Hall
(74) *Attorney, Agent, or Firm* — Anova Law Group, PLLC

(57) ABSTRACT

The present disclosure relates to the field of computer technologies, and discloses a method and a device for sending a communication message. The method includes: receiving, by a wearable device, a communication message sent by a transfer device, where the communication message is sent to the transfer device by a target device, and is forwarded to the wearable device by the transfer device when the transfer device meets a predetermined condition; receiving, by the wearable device, a reply message input for the communication message; and sending, by the wearable device, the reply message to the transfer device, where the reply message is forwarded to the target device by the transfer device. The present disclosure resolves a problem that a user cannot send or reply to a communication message in time when it is inconvenient to operate an electronic (Continued)

device, and achieves an effect of improving communication efficiency.

20 Claims, 13 Drawing Sheets

(51) Int. Cl.
| | | |
|---|---|---|
| H04B 1/3827 | (2015.01) | |
| H04L 29/08 | (2006.01) | |
| H04L 29/06 | (2006.01) | |
| H04L 12/413 | (2006.01) | |
| H04L 12/24 | (2006.01) | |
| G06Q 20/32 | (2012.01) | |
| H04L 12/58 | (2006.01) | |
| H04M 1/725 | (2006.01) | |
| G04G 9/00 | (2006.01) | |
| G04G 21/04 | (2013.01) | |

(52) U.S. Cl.
CPC ........... *G06Q 20/327* (2013.01); *H04B 1/385* (2013.01); *H04L 12/413* (2013.01); *H04L 41/50* (2013.01); *H04L 51/00* (2013.01); *H04L 51/06* (2013.01); *H04L 51/14* (2013.01); *H04L 51/16* (2013.01); *H04L 51/18* (2013.01); *H04L 63/08* (2013.01); *H04L 67/306* (2013.01); *H04M 1/7253* (2013.01); *H04M 1/72547* (2013.01); *G04G 9/0064* (2013.01); *G04G 21/04* (2013.01); *H04B 2001/3861* (2013.01); *H04L 51/20* (2013.01); *H04L 51/32* (2013.01)

(56) References Cited

U.S. PATENT DOCUMENTS

| | | | | |
|---|---|---|---|---|
| 2009/0048070 | A1* | 2/2009 | Vincent | A63B 24/0021 482/8 |
| 2011/0294489 | A1* | 12/2011 | Wang | G06F 3/0227 455/419 |
| 2012/0165047 | A1* | 6/2012 | Dolenc | H04L 51/02 455/466 |
| 2014/0106677 | A1* | 4/2014 | Altman | H04W 4/80 455/41.2 |
| 2014/0154987 | A1* | 6/2014 | Lee | H04W 76/14 455/41.2 |
| 2014/0194064 | A1* | 7/2014 | Murakami | H04W 4/008 455/41.2 |
| 2014/0282153 | A1* | 9/2014 | Christiansen | G06Q 30/0201 715/765 |
| 2014/0298353 | A1* | 10/2014 | Hsu | G06F 9/54 719/313 |
| 2015/0031348 | A1* | 1/2015 | Lee | H04B 1/385 455/418 |
| 2015/0186092 | A1* | 7/2015 | Francis | G06F 3/1423 345/520 |
| 2015/0256685 | A1* | 9/2015 | Amberden | H04M 19/04 455/567 |
| 2015/0288804 | A1* | 10/2015 | Kadous | H04M 1/72577 455/418 |
| 2015/0341900 | A1* | 11/2015 | Jeong | H04W 68/02 455/458 |
| 2015/0341903 | A1* | 11/2015 | Jeong | H04W 68/02 455/458 |
| 2016/0014266 | A1* | 1/2016 | Bhatt | H04M 1/7253 455/556.1 |
| 2016/0028869 | A1* | 1/2016 | Bhatt | H04M 1/7253 455/41.2 |
| 2016/0037345 | A1* | 2/2016 | Margadoudakis | H04L 63/0853 455/411 |
| 2016/0070449 | A1* | 3/2016 | Christiansen | G06Q 30/02 715/765 |
| 2016/0110318 | A1* | 4/2016 | Zhou | G06F 3/04883 715/273 |
| 2016/0164559 | A1* | 6/2016 | Kim | H04B 1/385 455/575.6 |
| 2016/0262094 | A1* | 9/2016 | Khay-Ibbat | H04W 72/048 |
| 2016/0283020 | A1* | 9/2016 | Heo | G06F 3/0416 |
| 2016/0308794 | A1* | 10/2016 | Kim | H04L 51/02 |
| 2017/0135635 | A1* | 5/2017 | Bostick | A61B 5/681 |
| 2017/0223168 | A1* | 8/2017 | Singh | H04W 4/12 |
| 2017/0303129 | A1* | 10/2017 | Boettcher | H04M 1/7253 |
| 2018/0239932 | A1* | 8/2018 | Gummeson | H04W 8/005 |
| 2018/0365958 | A1* | 12/2018 | Beszteri | H04L 29/08 |

FOREIGN PATENT DOCUMENTS

| | | |
|---|---|---|
| CN | 104660494 A | 5/2015 |
| CN | 104967557 A | 10/2015 |
| WO | 2014143776 A2 | 9/2014 |
| WO | 2014143776 A3 | 12/2014 |
| WO | 2015065494 A1 | 5/2015 |

OTHER PUBLICATIONS

State Intellectual Property Office of the P.R.C (SIPO) Office Action 1 for 201510284411.2 dated Aug. 15, 2016 11 Pages.

Korean Intellectual Property Office (KIPO) Office Action 1 for 10-2017-7036769 dated Aug. 27, 2018 13 Pages (including translation).

* cited by examiner

METHOD AND DEVICE FOR SENDING COMMUNICATION MESSAGE

CROSS-REFERENCES TO RELATED APPLICATION

This application is a continuation application of PCT Patent Application No. PCT/CN2016/079303, filed on Apr. 14, 2016, which claims priority to Chinese Patent Application No. 201510284411.2, entitled "METHOD AND DEVICE FOR SENDING COMMUNICATION MESSAGE" and filed with the Chinese Patent Office on May 28, 2015, the entire contents of both of which are incorporated herein by reference.

FIELD OF THE TECHNOLOGY

The present disclosure relates to the field of computer technologies, and in particular, to a method and a device for sending a communication message.

BACKGROUND OF THE DISCLOSURE

With development of communications technologies, more users communicate with other users by using a social application installed in an electronic device. The social application may be WeChat, Weibo, QQ, or the like.

Assuming that a user A uses an electronic device A, and a user B uses an electronic device B, in a process of communicating by using a social application, if the electronic device A initiates a communication process, the electronic device A sends a communication message to the electronic device B by using the social application; if the electronic device B initiates a communication process, after the electronic device A receives a communication message sent by the electronic device B, the electronic device A displays the communication message and an input box by using the social application, receives a reply message input in the input box by the user A, and then sends the reply message to the electronic device B.

A user cannot send or reply to a communication message in time when it is inconvenient to operate an electronic device such as when driving a car, causing low communication efficiency.

SUMMARY

To resolve a problem that a user cannot send or reply to a communication message in time when it is inconvenient to operate an electronic device, embodiments of the present disclosure provide a method and a device for sending a communication message. The technical solutions are as follows:

According to a first aspect, a method for sending a communication message is provided, where the method includes: receiving, by a wearable device, an incoming communication message sent by a transfer device, where the incoming communication message is sent to the transfer device by a first target device, and is forwarded to the wearable device by the transfer device when the transfer device meets a predetermined condition; receiving, by the wearable device, a reply message input for the incoming communication message; and sending, by the wearable device, the reply message to the transfer device, where the reply message is forwarded to the first target device by the transfer device.

According to a second aspect, a method for sending a communication message is provided, where the method includes: obtaining, by a wearable device, an identifier of a second target device; receiving, by the wearable device, an outgoing communication message based on user input; and sending, by the wearable device, the outgoing communication message and the identifier to a transfer device, where the transfer device is configured to determine the second target device according to the identifier, and forward the outgoing communication message to the second target device.

According to a third aspect, a method for sending a communication message is provided, where the method includes: receiving, by a transfer device, a communication message sent by a target device; detecting, by the transfer device, whether the transfer device meets a predetermined condition; forwarding, by the transfer device, the communication message to a wearable device when the transfer device meets the predetermined condition; and receiving, by the transfer device, a reply message sent by the wearable device, and forwarding the reply message to the target device, where the reply message is input to the wearable device for the communication message.

According to a fourth aspect, a method for sending a communication message is provided, where the method includes: receiving, by a transfer device, a communication message and an identifier of a target device that are sent by a wearable device; determining, by the transfer device, the target device according to the identifier; and forwarding, by the transfer device, the communication message to the target device.

According to a fifth aspect, an apparatus for sending a communication message is provided, where the apparatus includes: a first receiving module, configured to receive a communication message sent by a transfer device, where the communication message is sent to the transfer device by a target device, and is forwarded to a wearable device by the transfer device when the transfer device meets a predetermined condition; a second receiving module, configured to receive a reply message input for the communication message received by the first receiving module; and a first sending module, configured to send the reply message received by the second receiving module to the transfer device, where the reply message is forwarded to the target device by the transfer device.

According to a sixth aspect, an apparatus for sending a communication message is provided, where the apparatus includes: an identifier obtaining module, configured to obtain an identifier of a target device; a message receiving module, configured to receive an input communication message; and a sending module, configured to send the communication message received by the message receiving module and the identifier obtained by the identifier obtaining module to a transfer device, where the transfer device is configured to determine the target device according to the identifier, and forward the communication message to the target device.

According to a seventh aspect, an apparatus for sending a communication message is provided, where the apparatus includes: a message receiving module, configured to receive a communication message sent by a target device; a condition detection module, configured to detect whether a transfer device meets a predetermined condition; a first sending module, configured to forward the communication message to a wearable device when the condition detection module detects that the transfer device meets the predetermined condition; and a first forwarding module, configured to receive a reply message sent by the wearable device, and forward the reply message to the target device, where the reply message is input to the wearable device for the communication message.

According to an eighth aspect, an apparatus for sending a communication message is provided, where the apparatus includes: a first receiving module, configured to receive a communication message and an identifier of a target device that are sent by a wearable device; a device determining module, configured to determine the target device according to the identifier received by the first receiving module; and a message forwarding module, configured to forward the communication message to the target device determined by the device determining module.

According to a ninth aspect, a wearable device is provided, where the wearable device includes: one or more processors; and a memory, where the memory stores one or more programs, where the one or more programs are configured to be executed by the one or more processors, and the one or more programs include instructions used for performing the following operations: receiving an incoming communication message sent by a transfer device, where the communication message is sent to the transfer device by a first target device, and is forwarded to the wearable device by the transfer device when the transfer device meets a predetermined condition; receiving a reply message input for the incoming communication message; and sending the reply message to the transfer device, where the reply message is forwarded to the first target device by the transfer device.

According to a tenth aspect, a wearable device is provided, where the wearable device includes: one or more processors; and a memory, where the memory stores one or more programs, where the one or more programs are configured to be executed by the one or more processors, and the one or more programs include instructions used for performing the following operations: obtaining an identifier of a second target device; receiving an outgoing communication message based on user input; and sending the communication message and the identifier to a transfer device, where the transfer device is configured to determine the second target device according to the identifier, and forward the outgoing communication message to the second target device.

According to an eleventh aspect, a transfer device is provided, where the transfer device includes: one or more processors; and a memory, where the memory stores one or more programs, where the one or more programs are configured to be executed by the one or more processors, and the one or more programs include instructions used for performing the following operations: receiving a communication message sent by a target device; detecting whether the transfer device meets a predetermined condition; forwarding the communication message to a wearable device when the transfer device meets the predetermined condition; and receiving a reply message sent by the wearable device, and forwarding the reply message to the target device, where the reply message is input to the wearable device for the communication message.

According to a twelfth aspect, a transfer device is provided, where the transfer device includes: one or more processors; and a memory, where the memory stores one or more programs, where the one or more programs are configured to be executed by the one or more processors, and the one or more programs include instructions used for performing the following operations: receiving a communication message and an identifier of a target device that are sent by a wearable device; determining the target device according to the identifier; and forwarding the communication message to the target device.

By implementing the technical solutions provided in the embodiments of the present disclosure: a communication message sent by a transfer device is received, where the communication message is sent to the transfer device by a target device, and is forwarded to a wearable device by the transfer device when the transfer device meets a predetermined condition; a reply message input for the communication message is received; and the reply message is sent to the transfer device, where the reply message is forwarded to the target device by the transfer device. When the transfer device meets the predetermined condition, it may be determined that it is inconvenient for a user to operate the electronic device; in this case, the user replies to the communication message by using a worn wearable device, thereby resolving a problem that the user cannot reply to the communication message in time when it is inconvenient to operate the electronic device, and achieving an effect of improving communication efficiency.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objective, technical solutions and advantages of the present disclosure clearer, the following further describes in detail implementation manners of the present disclosure with reference to the accompanying drawings.

Figure 1:
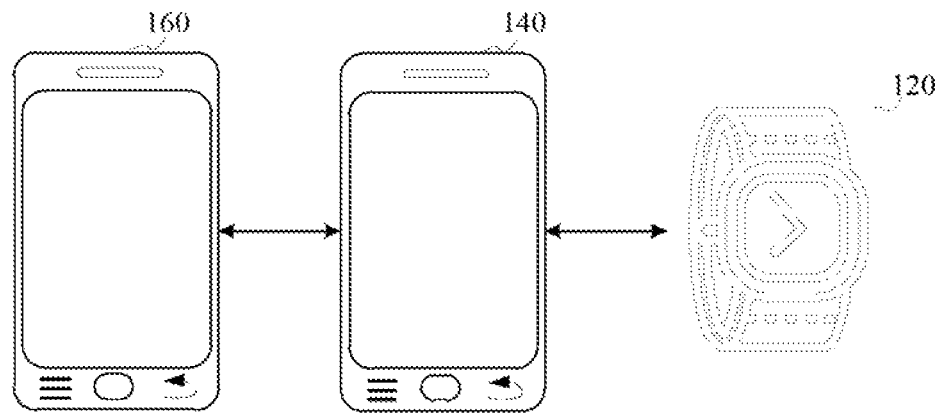
FIG. 1 is a schematic structural diagram of a communications system according to an embodiment of the present disclosure.

Referring to FIG. 1, FIG. 1 shows a schematic structural diagram of a communications system according to an embodiment of the present disclosure. The communications system includes a wearable device 120, a transfer device 140, and a target device 160.

A social application is running in the wearable device 120, and the social application may be WeChat, Weibo, QQ, or the like. The wearable device 120 may be a smart band, a smart watch, smart glasses, a smart belt, a smart ring, or the like. Optionally, the wearable device 120 may include a display screen, or may not include a display screen, which is not limited in this embodiment.

The wearable device 120 further includes a communication module. When the communication module is a Bluetooth module, the wearable device 120 establishes a Bluetooth-based communication connection to a Bluetooth module of the transfer device 140 by using the Bluetooth module; and when the communication module is a WiFi (Wireless Fidelity) module, the wearable device 120 establishes a WiFi-based communication connection to a WiFi module of the transfer device 140 by using the WiFi module.

A social application is running in the transfer device 140, and the social application is coupled to the social application running in the wearable device 140. The transfer device 140 may be a mobile phone, a tablet computer, an e-book reader, an MP3 (Moving Picture Experts Group Audio Layer III) player, an MP4 (Moving Picture Experts Group Audio Layer IV) player, a laptop computer, a desktop computer, or the like. In some embodiments, the social application on the wearable device 120 and the coupling social application on the transfer device 140 may respectively run in the background, and be activated based on a user input or when an incoming message is received.

A social application is running in the target device 160, and the social application may be the same social application running in the wearable device 140 or the transfer device 140. The target device 160 may be a mobile phone, a tablet computer, an e-book reader, an MP3 player, an MP4 player, a laptop computer, a desktop computer, or the like.

The transfer device 140 may be connected to the target device 160 by means of a communications network, where the communications network is a wired network or a wireless network.

Figure 2:
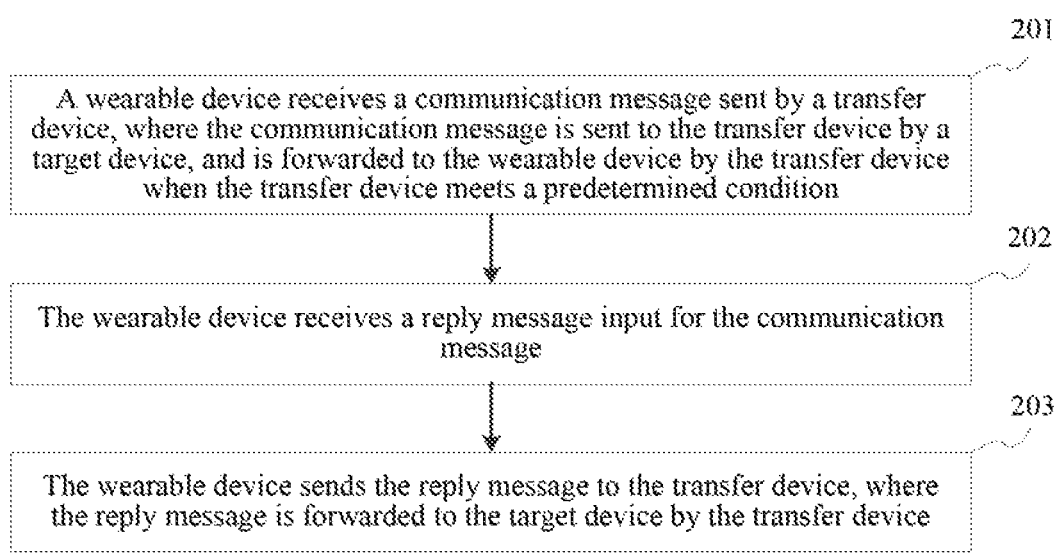
FIG. 2 is a method flowchart of a method for sending a communication message according to an embodiment of the present disclosure.

Referring to FIG. 2, FIG. 2 shows a method flowchart of a method for sending a communication message according to an embodiment of the present disclosure. The method for sending a communication message may be applied to the wearable device 120 shown in FIG. 1. The method for sending a communication message includes:

Step 201. A wearable device receives a communication message sent by a transfer device, where the communication message is sent to the transfer device by a target device (i.e., an incoming communication message), and is forwarded to the wearable device by the transfer device when the transfer device meets a predetermined condition.

Step 202. The wearable device receives a reply message input for the communication message.

Step 203. The wearable device sends the reply message to the transfer device, where the reply message is forwarded to the target device by the transfer device.

In conclusion, by means of the method for sending a communication message provided in this embodiment of the present disclosure, a communication message sent by a transfer device is received, where the communication message is sent to the transfer device by a target device, and is forwarded to a wearable device by the transfer device when the transfer device meets a predetermined condition; a reply message input for the communication message is received; and the reply message is sent to the transfer device, where the reply message is forwarded to the target device by the transfer device. When the transfer device meets the predetermined condition, it may be determined that it is inconvenient for a user to operate the electronic device; in this case, the user replies to the communication message by using a worn wearable device, thereby resolving a problem that the user cannot reply to the communication message in time when it is inconvenient to operate the electronic device, and achieving an effect of improving communication efficiency.

Figure 3:
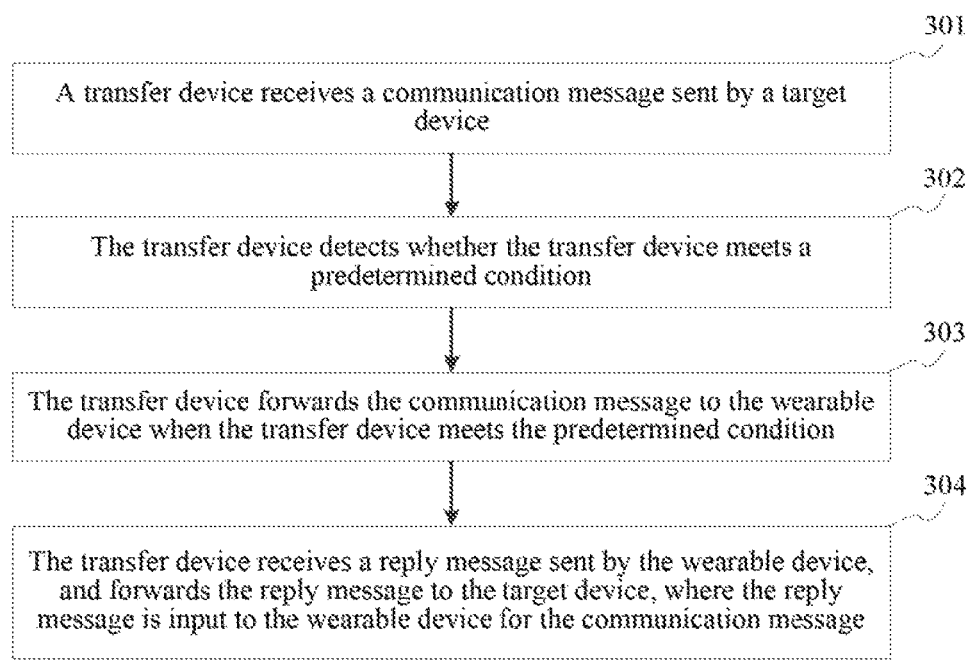
FIG. 3 is a method flowchart of a method for sending a communication message according to an embodiment of the present disclosure.

Referring to FIG. 3, FIG. 3 shows a method flowchart of a method for sending a communication message according to an embodiment of the present disclosure. The method for sending a communication message may be applied to the transfer device 140 shown in FIG. 1. The method for sending a communication message includes:

Step 301. A transfer device receives a communication message sent by a target device.

Step 302. The transfer device detects whether the transfer device meets a predetermined condition.

Step 303. The transfer device forwards the communication message to a wearable device when the transfer device meets the predetermined condition.

Step 304. The transfer device receives a reply message sent by the wearable device, and forwards the reply message to the target device, where the reply message is input to the wearable device for the communication message.

In conclusion, by means of the method for sending a communication message provided in this embodiment of the present disclosure, when a transfer device meets a predetermined condition, a communication message is sent to a wearable device; a reply message sent by the wearable device is received, where the reply message is sent to a target device. When the transfer device meets the predetermined condition, it may be determined that it is inconvenient for a user to operate the electronic device; in this case, the user replies to the communication message by using a worn wearable device, thereby resolving a problem that the user cannot reply to the communication message in time when receiving the communication message when it is inconvenient to operate the electronic device, and achieving an effect of improving communication efficiency.

Figure 4A:
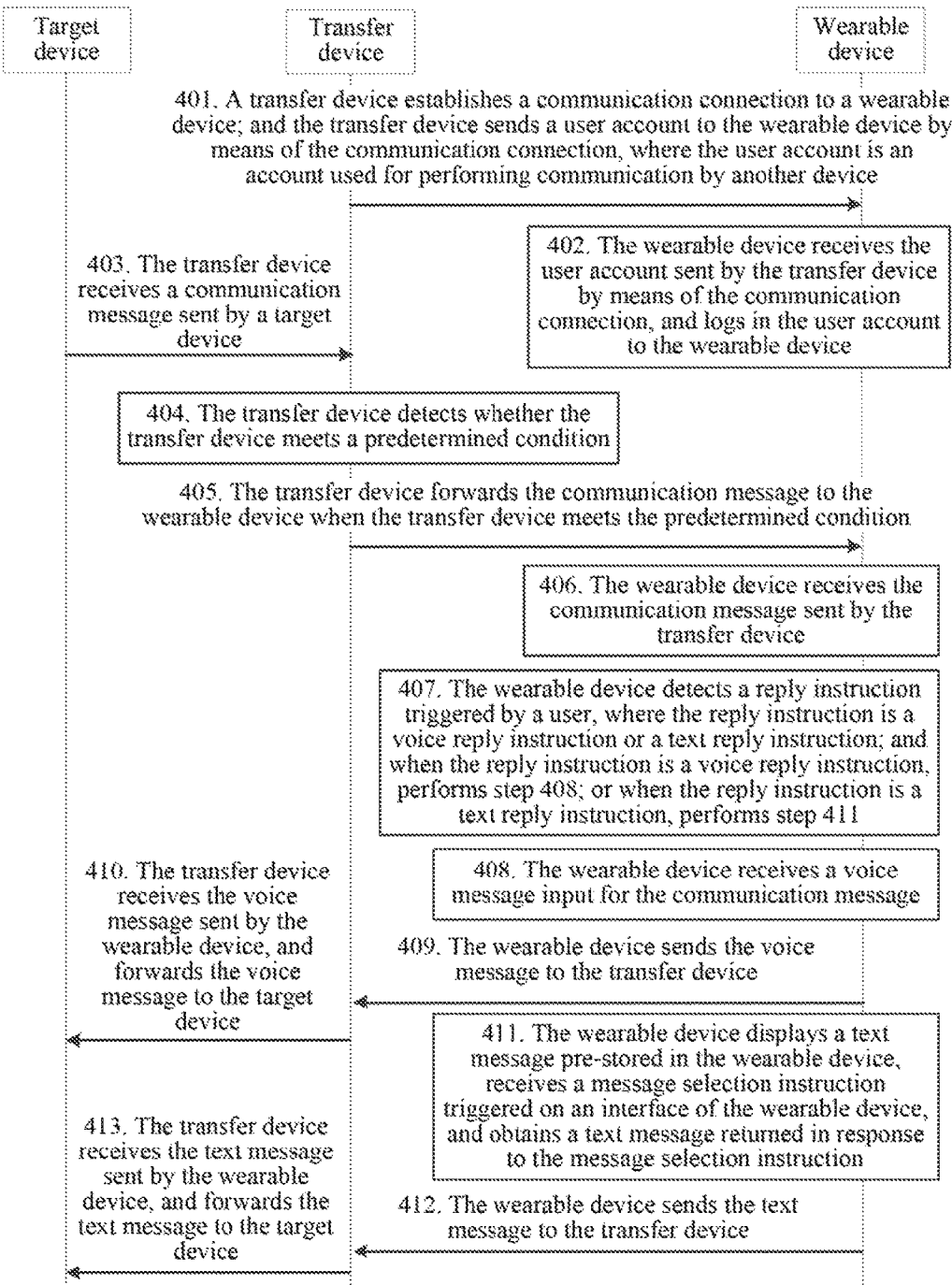
FIG. 4A is a method flowchart of a method for sending a communication message according to another embodiment of the present disclosure.

Referring to FIG. 4A, FIG. 4A shows a method flowchart of a method for sending a communication message according to another embodiment of the present disclosure. The method for sending a communication message may be applied to the communications system shown in FIG. 1. The method for sending a communication message includes:

Step 401. A transfer device establishes a communication connection to a wearable device; and the transfer device sends a user account to the wearable device by means of the communication connection, where the user account is an account used for performing communication by another device.

The transfer device needs to determine a wearable device that is about to forward a communication message, and establish a communication connection to the wearable device. The communication connection may include a wired connection and a wireless connection, where the wireless connection may include a Bluetooth connection, a WiFi connection, or the like.

In this embodiment, a Bluetooth connection established between a transfer device and a wearable device is used as an example. To avoid establishing a Bluetooth connection to a wearable device of another user, after a transfer device finds a wearable device through search, the transfer device receives a paired key set by a user, and then sends a connection establishment request to the wearable device; after receiving the connection establishment request, the wearable device inputs a paired key and sends the paired key to the transfer device; and when determining that the received paired key is the same as the set paired key, the transfer device establishes a Bluetooth connection to the wearable device, thereby ensuring security of a communication process.

After the transfer device establishes the Bluetooth connection to the wearable device, the wearable device may input a user account into an installed social application. A display screen of the wearable device is small, it is quite difficult to input a user account, and the user account cannot be accurately input; therefore, the wearable device may obtain the user account from the transfer device, to improve accuracy of obtaining the user account. Specifically, the wearable device may request the transfer device for a user account of a social application, and the transfer device sends the user account to the wearable device according to the request, or the transfer device may actively send the user account to the wearable device, to reduce communication resources.

The user account is an account used for performing communication by another device. When WeChat needs to be used for communicating with another device, the user account is a WeChat number, and the communication message is a WeChat message; when Weibo needs to be used for communicating with another device, the user account is a Weibo number, and the communication message is a Weibo message; when QQ needs to be used for communicating with another device, the user account is a QQ number, and the communication message is a QQ message.

Step 402. The wearable device receives the user account sent by the transfer device by means of the communication connection, and logs in the user account to the wearable device.

After receiving the user account, the wearable device directly logs in the user account to a social application installed in the wearable device.

Step 403. The transfer device receives a communication message sent by a target device.

The transfer device and the target device are installed with a same social application. When the transfer device and the target device are respectively logged with a user account, a communication message may be received and sent between the transfer device and the target device by using the social application logged with the user account.

Step 404. The transfer device detects whether the transfer device meets a predetermined condition.

When the transfer device receives the communication message, a user of the transfer device is busy and it is inconvenient to operate the electronic device. In this case, the transfer device may forward the communication message to a wearable device of the user, the user may reply to the communication message by using the wearable device, instead of operating the electronic device, to improve reply efficiency of the communication message.

In this embodiment, the user may preset a predetermined condition. When receiving the communication message, the transfer device detects whether the transfer device meets the predetermined condition; when the transfer device meets the predetermined condition, perform step 303; or when the transfer device does not meet the predetermined condition, the transfer device prompts the user to reply to the communication message. In this embodiment, only six predetermined conditions are used as an example, and specific implementation manners of the predetermined conditions are not limited.

In this case, the detecting, by the transfer device, whether the transfer device meets a predetermined condition includes: 1) detecting, by the transfer device, whether an interface currently displayed by the transfer device is a display interface of the communication message; or 2) detecting, by the transfer device, whether a currently displayed interface is a display interface of a social application corresponding to the communication message; or 3) detecting, by the transfer device, whether the transfer device is currently in a lock screen status, and detecting whether a control switch in the transfer device is in a predetermined status, where the predetermined status is used for indicating that the transfer device is allowed to send the communication message to the wearable device; or 4) detecting, by the transfer device, whether the transfer device receives, within a first time period, a first historical message sent by the wearable device, where an end moment of the first time period is a moment at which the transfer device receives the communication message, and the first historical message is a reply message obtained by the wearable device according to a communication message received at a historical moment, or the first historical message is a communication message sent by the wearable device at a historical moment; or 5) detecting, by the transfer device, whether the transfer device sends a second historical message to the wearable device within a second time period, where an end moment of the second time period is a moment at which the transfer device receives the communication message, and the second historical message is a communication message received by the wearable device at a historical moment; or 6) detecting, by the transfer device, whether the transfer device is running a predetermined service application.

In a first implementation manner, when an interface currently displayed by the transfer device is a display interface of the communication message, it indicates that the transfer device is communicating with the target device by using the display interface, that is, it is convenient for the user to operate the electronic device at this time, so that the transfer device determines that the transfer device does not meet the predetermined condition, and directly displays the communication message on the display interface, and the procedure ends. When the interface currently displayed by the transfer device is not a display interface of the communication message, it indicates that the user may be invoking another application by using the transfer device, for example, the transfer device is invoking a browser, or the transfer device is invoking another social application, or the transfer device is invoking the social application to communicate with another target device. To avoid switching a display interface to interrupt the user, the transfer device determines that the transfer device meets the predetermined condition.

It should be noted that, the transfer device may further be disposed with a control switch, where the control switch is configured to control the transfer device to send the communication message to the wearable device. For example, when the control switch is in an enabled status, it indicates that the transfer device is allowed to send the communication message to the wearable device; and when the control switch is in a disabled status, it indicates that the transfer device is forbidden to send the communication message to the wearable device. Alternatively, when the control switch is in an enabled status, it indicates that the transfer device is forbidden to send the communication message to the wearable device; and when the control switch is in a disabled status, it indicates that the transfer device is allowed to send the communication message to the wearable device.

In this implementation manner, the transfer device detects that the interface currently displayed by the transfer device is not a display interface of the communication message, no matter whether the control switch is in an enabled status or a disabled status, it may be determined that the transfer device meets the predetermined condition.

In a second implementation manner, when the interface currently displayed by the transfer device is a display interface of a social application corresponding to the communication message, it indicates that the transfer device is communicating in the social application with another device, that is, it is convenient for the user to operate the electronic device at this time, so that the transfer device determines that the transfer device does not meet the predetermined condition, and directly displays the communication message on the display interface, and the procedure ends. When the interface currently displayed by the transfer device is not a display interface of a social application corresponding to the communication message, it indicates that the user may be invoking another application by using the transfer device, for example, the transfer device is invoking a browser, or the transfer device is invoking another social application. To avoid switching a display interface to interrupt the user, the transfer device determines that the transfer device meets the predetermined condition.

It should be noted that, the transfer device may further be disposed with a control switch, and for detailed content of the control switch, refer to description in the first implementation manner.

In this implementation manner, when the transfer device detects that the interface currently displayed by the transfer device is not a display interface of a social application corresponding to the communication message, no matter whether the control switch is in an enabled status or a disabled status, it may be determined that the transfer device meets the predetermined condition.

In a third implementation manner, when the transfer device is in a lock screen status, it indicates that the user is not using the transfer device, and the user may not check in time the communication message received by the transfer device. In this case, the transfer device may directly determine that the transfer device meets the predetermined condition. Alternatively, when the transfer device is disposed with a control switch, when detecting that the transfer device is in a lock screen status, the transfer device may further read a status of the control switch; when the control switch is in a predetermined status and the predetermined status is used for indicating that the transfer device is allowed to send the communication message to the wearable device, it is determined that the transfer device meets the predetermined condition; when detecting that the transfer device is in a lock screen mode, and the control switch is not in a predetermined status, the transfer device determines that the transfer device does not meet the predetermined condition. The predetermined status may be an enabled status, or may be a disabled status, which is not limited in this embodiment.

In a fourth implementation manner, when the wearable device has replied to the communication message at a historical moment within a first time period, the transfer device may directly determine that the transfer device meets the predetermined condition. Duration determined by the historical moment and a moment at which the transfer device receives the communication message at this time is less than or equal to duration of the first time period.

For example, the transfer device receives a communication message at 9:29 Mar. 31, 2015. Assuming that duration of the first time period is 5 minutes, in this case, the first time period obtained through calculation is 9:24 Mar. 31, 2015 to 9:29 Mar. 31, 2015. If the transfer device receives, at 9:28 Mar. 31, 2015, a first historical message sent by the wearable device, because a receiving moment of the first historical message is within the first time period, the transfer device determines that the transfer device meets the predetermined condition.

In a fifth implementation manner, when the transfer device has sent the communication message to the wearable device at a historical moment within a second time period, the transfer device may directly determine that the transfer device meets the predetermined condition. Duration determined by the historical moment and a moment at which the transfer device receives the communication message at this time is less than or equal to duration of the second time period.

For example, the transfer device receives a communication message at 9:29 Mar. 31, 2015. Assuming that duration of the second time period is 5 minutes, in this case, the second time period obtained through calculation is 9:24 Mar. 31, 2015 to 9:29 Mar. 31, 2015. If the transfer device has sent a second historical message to the wearable device at 9:28 Mar. 31, 2015, because a sending moment of the second historical message is within the second time period, the transfer device determines that the transfer device meets the predetermined condition.

In a sixth implementation manner, the predetermined service application may be a navigational application, a game application, or the like, and is used for indicating that it is currently inconvenient for the user to operate the transfer device. For example, when the transfer device is running a navigational application, it is determined that the user is driving a car, in this case, it is determined that the transfer device meets the predetermined condition; and when the transfer device is running a game application, it is determined that the user is playing a game, in this case, it is determined that the transfer device meets the predetermined condition.

The transfer device may preset an application list, where the application list is used for storing the predetermined service application. When receiving the communication message, the transfer device detects whether an application that is running in the transfer device is an application in the application list; and when the application that is running in the transfer device is an application in the application list, determines that the transfer device meets the predetermined condition; or when the application that is running in the transfer device is not an application in the application list, determines that the transfer device does not meet the predetermined condition.

Step 405. The transfer device forwards the communication message to the wearable device when the transfer device meets the predetermined condition.

It should be noted that, step 401 and step 402 may also be performed when it is detected that the transfer device meets the predetermined condition.

Step 406. The wearable device receives the communication message sent by the transfer device.

Step 407. The wearable device detects a reply instruction triggered by a user, where the reply instruction is a voice reply instruction or a text reply instruction; and when the reply instruction is a voice reply instruction, performs step 408; or when the reply instruction is a text reply instruction, performs step 411.

After receiving the communication message, the wearable device may input a text message for reply. Because a display screen of the wearable device is small, and it is difficult to input a text, the wearable device further provides a voice reply manner, to improve reply real-time performance.

After the wearable device receives the communication message, the user may select a reply manner. In an implementation manner, the user selects a reply manner by using voice, for example, the user inputs voice for "voice reply", to trigger a voice reply instruction. In another implementation manner, the wearable device may display options of a text reply manner and a voice reply manner on a receiving interface of the communication message; and if the user selects the option of the text reply manner, a text reply instruction is triggered, and in this case, the wearable device performs step 411; or if the user selects the option of the voice reply manner, a voice reply instruction is triggered, and in this case, the wearable device performs step 408.

Figure 4B:
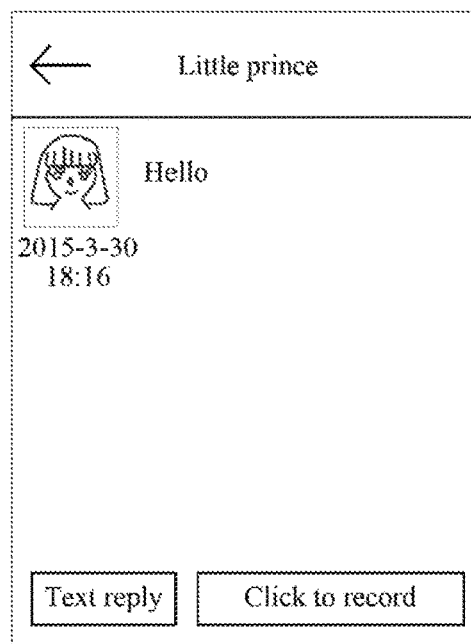
FIG. 4B is a first schematic diagram of a reply interface according to an embodiment of the present disclosure.

Referring to a first schematic diagram of a reply interface shown in FIG. 4B, a lower side of the interface of FIG. 4B displays options of "text reply" and "click to record"; and if the user selects the option of "text reply", a text reply instruction is triggered; or if the user selects the option of "click to record", a voice reply instruction is triggered.

It should be noted that, the wearable device may further automatically select a reply manner according to a type of the communication message. For example, when the communication message is a text message, the wearable device uses a text reply manner; or when the communication message is a voice message, the wearable device uses a voice reply manner.

Step 408. The wearable device receives a voice message input for the communication message.

Figure 4C:
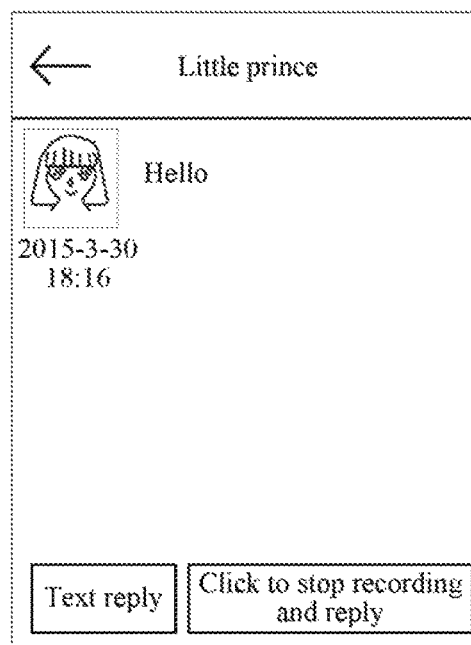
FIG. 4C is a second schematic diagram of a reply interface according to an embodiment of the present disclosure.

When the wearable device receives the voice reply instruction, the wearable device invokes a microphone to perform recording. Referring to a second schematic diagram of a reply interface shown in FIG. 4C, after the user clicks an option of "start to record" in FIG. 4B, an option of "click to stop recording and reply" in FIG. 4C is displayed, the user starts to input voice, and when the user ends inputting voice, the user clicks the option of "click to stop recording and reply", and in this case, the wearable device stops recording, and determines the voice input by the user as a voice message to be replied.

Step 409. The wearable device sends the voice message to the transfer device.

The wearable device may directly send the voice message to the transfer device, or may convert the voice message into a text message and send the text message to the transfer device. This embodiment does not limit a manner of sending the voice message by the wearable device.

Figure 4D:
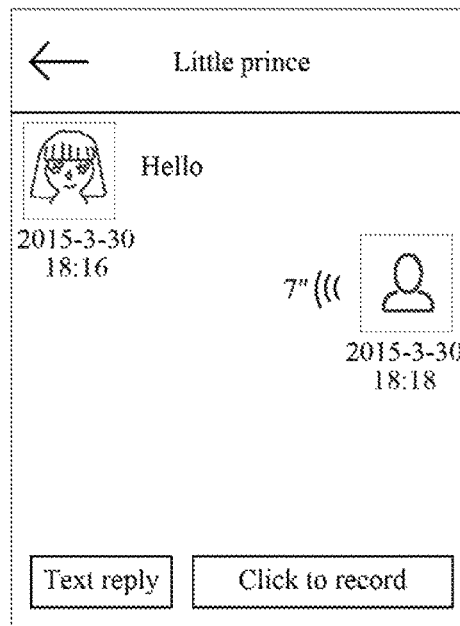
FIG. 4D is a third schematic diagram of a reply interface according to an embodiment of the present disclosure.

Referring to a third schematic diagram of a reply interface shown in FIG. 4D, after the wearable device sends the voice message to the transfer device, information, such as a time at which a communication message is replied to on a reply interface and a type of the communication message, is displayed. For example, when duration of the voice message is 7 seconds, and a reply time is 18:18 Mar. 30, 2015, 18:18:7 Mar. 30, 2015 may be displayed.

Step 410. The transfer device receives the voice message sent by the wearable device, and forwards the voice message to the target device, and the procedure ends.

After receiving the voice message, no matter whether the transfer device is in a screen-on status or a lock screen status, the transfer device directly forwards the voice message to the target device.

Step 411. The wearable device displays a text message pre-stored in the wearable device, receives a message selection instruction triggered on an interface of the wearable device, and obtains a text message returned in response to the message selection instruction.

Because it is quite difficult to input a text into the wearable device, the wearable device may further pre-store at least one text message, and the user may select one text message from the at least one text message for reply.

The text message may be preset in the transfer device by the user, and sent to the wearable device by the transfer device, or may be obtained from another device by the wearable device. This embodiment does not limit a source of the text message.

Step 412. The wearable device sends the text message to the transfer device.

Step 413. The transfer device receives the text message sent by the wearable device, and forwards the text message to the target device, and the procedure ends.

Optionally, the method provided in this embodiment further includes: 1) starting timing when receiving the communication message, and detecting, by the wearable device, whether the input reply message is received within a third time period from the starting of the timing; and 2) sending, by the wearable device, a predetermined reply message to the transfer device when the reply message is not received within the third time period, where the predetermined reply message is forwarded to the target device by the transfer device, and the predetermined reply message is a voice message or a text message.

Correspondingly, the method provided in this embodiment further includes: receiving, by the transfer device, a predetermined reply message sent by the wearable device, and forwarding the predetermined reply message to the target device, where the predetermined reply message is a voice message or a text message, the predetermined reply message is starting timing when the wearable device receives the communication message, and is sent after an input reply message is not received within a third time period from the starting of the timing.

If the wearable device does not receive the input reply message within the third time period after receiving the communication message, it indicates that at this time the user may not wear a wearable device, or the user may be busy, and it is inconvenient to operate the wearable device. To avoid that a user of a target device waits for a reply message, the wearable device may obtain a predetermined reply message, and send the predetermined reply message to the transfer device, so that the transfer device forwards the predetermined reply message to the target device, and the target device may determine, according to the predetermined reply message, that the user of the transfer device is in a busy status. The predetermined reply message may be "the user is busy, please do not disturb" or the like. Duration of the third time period may be automatically set and modified, which is not limited in this embodiment.

Optionally, the method provided in this embodiment further includes: 1) obtaining, by the transfer device, a contact account that sends the communication message; 2) detecting, by the transfer device, whether contact accounts previously sent by the wearable device include the contact account; and 3) skipping forwarding the communication message to the wearable device when the contact accounts previously sent by the wearable device include the contact account.

A contact account previously sent by the wearable device is an account in a blacklist. After receiving the communication message, the transfer device further needs to detect whether the contact account that sends the communication message is an account in the blacklist; when the contact account is an account in the blacklist, the communication message is not forwarded to the wearable device; when the contact account is not an account in the blacklist, the transfer device performs step 304.

Correspondingly, the method provided in this embodiment further includes: 1) displaying, by the wearable device, contact accounts stored in the wearable device; 2) receiving, by the wearable device, an account selection instruction, and obtaining a contact account returned in response to the account selection instruction; and 3) sending, by the wearable device, the obtained contact account to the transfer device, and when receiving a communication message sent by the contact account, the transfer device skips forwarding the communication message to the wearable device.

The user may select, from the contact accounts displayed by the wearable device, a contact account that needs to be added to the blacklist, and the wearable device sends the selected contact account to the transfer device.

In conclusion, by means of the method for sending a communication message provided in this embodiment of the present disclosure, a communication message sent by a transfer device is received, where the communication message is sent to the transfer device by a target device, and is forwarded to a wearable device by the transfer device when the transfer device meets a predetermined condition; a reply message input for the communication message is received; and the reply message is sent to the transfer device, where the reply message is forwarded to the target device by the transfer device. When the transfer device meets the predetermined condition, it may be determined that it is inconvenient for a user to operate the electronic device; in this case, the user replies to the communication message by using a worn wearable device, thereby resolving a problem that the user cannot reply to the communication message in time when it is inconvenient to operate the electronic device, and achieving an effect of improving communication efficiency.

In addition, a communication connection is established to the wearable device; and a user account is sent to the wearable device by means of the communication connection, where the user account may be directly sent to the wearable device, thereby avoiding a problem that the user account cannot be accurately input because a display screen of the wearable device is excessively small, and achieving an effect of improving accuracy of obtaining the user account.

Figure 5:
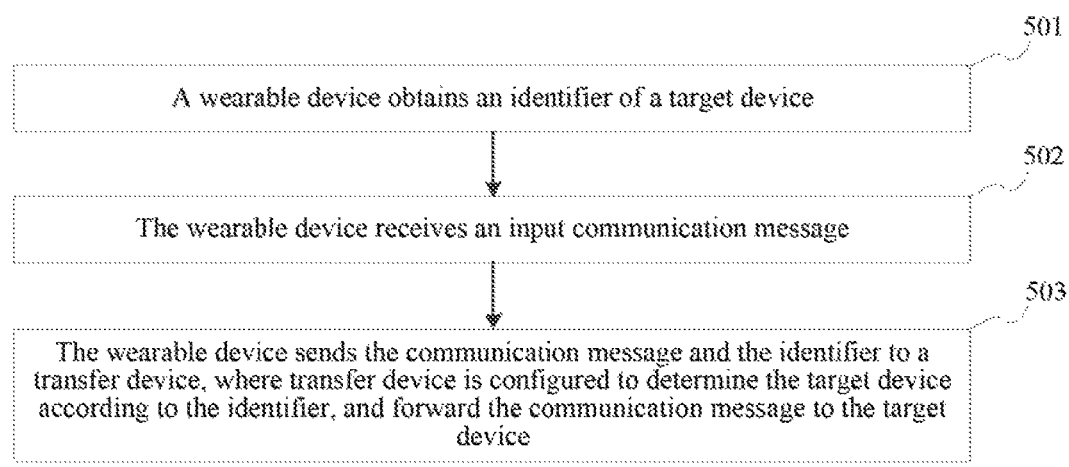
FIG. 5 is a method flowchart of a method for sending a communication message according to an embodiment of the present disclosure.

Referring to FIG. 5, FIG. 5 shows a method flowchart of a method for sending a communication message according to an embodiment of the present disclosure. The method for sending a communication message may be applied to the wearable device 120 shown in FIG. 1. The method for sending a communication message includes:

Step 501. A wearable device obtains an identifier of a target device.

Step 502. The wearable device receives an input communication message (i.e., an outgoing communication message based on user input).

Step 503. The wearable device sends the communication message and the identifier to a transfer device, where transfer device is configured to determine the target device according to the identifier, and forward the communication message to the target device.

In conclusion, by means of the method for sending a communication message provided in this embodiment of the present disclosure, a communication message and an identifier are sent to a transfer device, and the transfer device determines a target device according to the identifier, and sends the communication message to the target device. When the transfer device meets a predetermined condition, it may be determined that it is inconvenient for a user to operate the electronic device; in this case, the user sends the communication message by using a worn wearable device, thereby resolving a problem that the user cannot send the communication message in time when it is inconvenient to operate the electronic device, and achieving an effect of improving communication efficiency.

Figure 6:
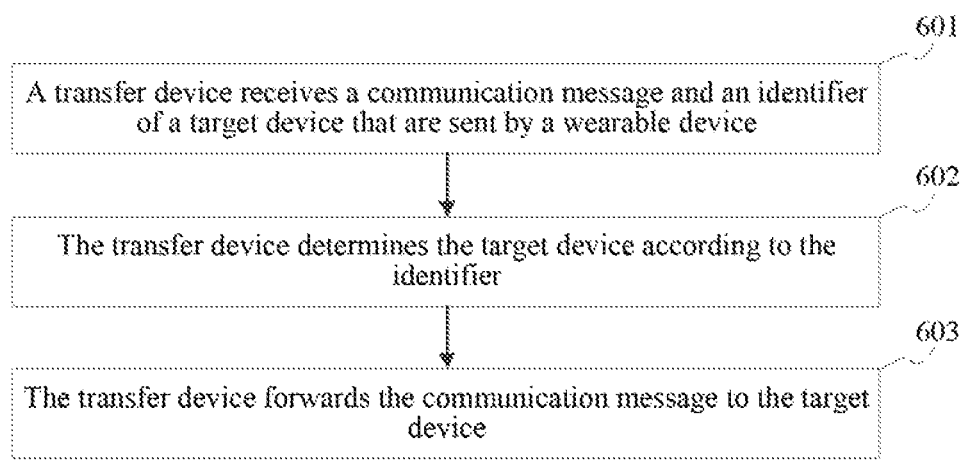
FIG. 6 is a method flowchart of a method for sending a communication message according to an embodiment of the present disclosure.

Referring to FIG. 6, FIG. 6 shows a method flowchart of a method for sending a communication message according to an embodiment of the present disclosure. The method for sending a communication message may be applied to the transfer device 140 shown in FIG. 1. The method for sending a communication message includes:

Step 601. A transfer device receives a communication message and an identifier of a target device that are sent by a wearable device (i.e., an outgoing message).

Step 602. The transfer device determines the target device according to the identifier.

Step 603. The transfer device forwards the communication message to the target device.

In conclusion, by means of the method for sending a communication message provided in this embodiment of the present disclosure, a communication message and an identifier of a target device that are sent by a wearable device are received, the target device is determined according to the identifier, and the communication message is forwarded to the target device. When a transfer device meets a predetermined condition, it may be determined that it is inconvenient for a user to operate the electronic device; in this case, the user sends the communication message by using a worn wearable device, thereby resolving a problem that the user cannot send the communication message in time when it is inconvenient to operate the electronic device, and achieving an effect of improving communication efficiency.

Figure 7:
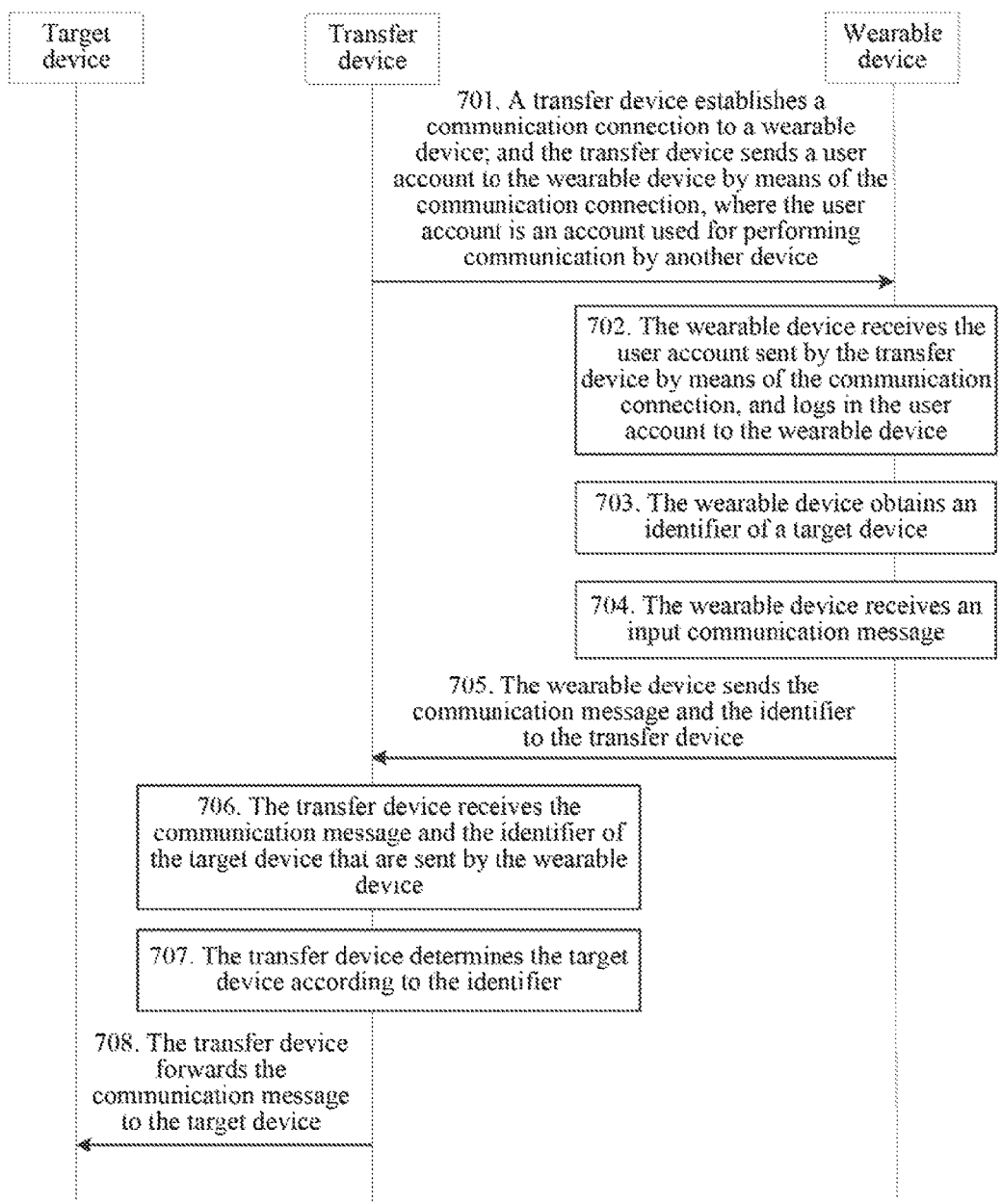
FIG. 7 is a method flowchart of a method for sending a communication message according to another embodiment of the present disclosure.

Referring to FIG. 7, FIG. 7 shows a method flowchart of a method for sending a communication message according to another embodiment of the present disclosure. The method for sending a communication message may be applied to the communications system shown in FIG. 1. The method for sending a communication message includes:

Step 701. A transfer device establishes a communication connection to a wearable device; and the transfer device sends a user account to the wearable device by means of the communication connection, where the user account is an account used for performing communication by another device.

The transfer device needs to determine a wearable device that is about to forward a communication message, and establish a communication connection to the wearable device. The communication connection may include a wired connection and a wireless connection, where the wireless connection may include a Bluetooth connection, a WiFi connection, or the like.

In this embodiment, a Bluetooth connection established between a transfer device and a wearable device is used as an example. To avoid establishing a Bluetooth connection to a wearable device of another user, after a transfer device finds a wearable device through search, the transfer device receives a paired key set by a user, and then sends a connection establishment request to the wearable device; after receiving the connection establishment request, the wearable device inputs a paired key and sends the paired key to the transfer device; and when determining that the received paired key is the same as the set paired key, the transfer device establishes a Bluetooth connection to the wearable device, thereby ensuring security of a communication process.

After the transfer device establishes the Bluetooth connection to the wearable device, the wearable device may input a user account into an installed social application. A display screen of the wearable device is small, it is quite difficult to input a user account, and the user account cannot be accurately input; therefore, the wearable device may obtain the user account from the transfer device, to improve accuracy of obtaining the user account. Specifically, the wearable device may request the transfer device for a user account of a social application, and the transfer device sends the user account to the wearable device according to the request, or the transfer device may actively send the user account to the wearable device, to reduce communication resources.

The user account is an account used for performing communication by another device. When WeChat needs to be used for communicating with another device, the user account is a WeChat number, and the communication message is a WeChat message; when Weibo needs to be used for communicating with another device, the user account is a Weibo number, and the communication message is a Weibo message; when QQ needs to be used for communicating with another device, the user account is a QQ number, and the communication message is a QQ message.

Step 702. The wearable device receives the user account sent by the transfer device by means of the communication connection, and logs in the user account to the wearable device.

After receiving the user account, the wearable device directly logs in the user account to a social application installed in the wearable device.

Step 703. The wearable device obtains an identifier of a target device.

The target device may be a server, or may be an electronic device. When the target device is an electronic device, the transfer device is also an electronic device. In this case, the transfer device and the target device are installed with a same social application. When the transfer device and the target device are respectively logged with a user account, a communication message may be received and sent between the transfer device and the target device by using the social application logged with the user account.

When the target device is a server, the identifier of the target device may be a server identifier, an IP (Internet Protocol) address of the server, or the like. When the target device is an electronic device, the identifier of the target device may be a contact account.

When the identifier is a contact account, the obtaining, by the wearable device, an identifier of a target device includes:
1) displaying, by the wearable device, contact accounts that are of target devices and that are stored in the wearable device, receiving an account selection instruction, and determining a contact account returned in response to the account selection instruction as a contact account of the target device; or
2) receiving, by the wearable device, input contact information, and detecting whether the wearable device stores a contact account that matches the contact information; when the wearable device stores the contact account that matches the contact information, determining the contact account as a contact account of the target device; or when the wearable device does not store the contact account that matches the contact information, sending the contact information to the transfer device, receiving the contact account that matches the contact information and that is sent by the transfer device, and determining the contact account as a contact account of the target device.

In a first possible implementation manner, the wearable device stores all contact accounts corresponding to the user account, or contact accounts that have communicated with the wearable device. In this case, the wearable device may receive an account displaying instruction, and display all the contact accounts under control of the account displaying instruction. The user selects, from the displayed contact accounts, a contact account that needs to receive a communication message, and triggers an account selection instruction. The wearable device obtains a contact account returned in response to the account selection instruction, and determines the contact account as a contact account of a target device that needs to receive the communication message. One target device corresponds to at least one contact account. The account displaying instruction may be triggered by an option displayed on an interface on which the user triggers the wearable device, or may be obtained by parsing voice input by the user, which is not limited in this embodiment.

In a second possible implementation manner, the wearable device stores contact accounts that have communicated with the wearable device. In this case, the wearable device may receive contact information input by the user, and detects whether the wearable device stores a contact account that matches the contact information. The contact information may be a name, a nickname, an account, or the like of a user or a group, and there is a correspondence between the contact information and the contact account. For example, contact information "Xiao Ming" corresponds to a contact account "123456".

When the wearable device stores a contact account that matches the contact information, the wearable device determines the contact account as a contact account of the target device that needs to receive the communication message; when the wearable device does not store a contact account that matches the contact information, the wearable device may send the contact information to the transfer device.

Correspondingly, when the identifier is a contact account, before the receiving, by the transfer device, the communication message and the identifier of the target device that are sent by the wearable device, the method further includes: 1) receiving, by the transfer device, contact information sent by the wearable device, where the contact information is sent to the transfer device when the wearable device does not store the contact account that matches the contact information; 2) detecting, by the transfer device, whether the transfer device stores the contact account that matches the contact information; and 3) sending, by the transfer device, the contact account to the wearable device when the transfer device stores the contact account that matches the contact information, where the wearable device determines the contact account as a contact account of the target device.

In some embodiments, when the contact information is not found on the transfer device, the transfer device may further send a search query about the contact information to a server of the social application. The transfer device may receive search results returned by the server and send one or more searched contacts to the wearable device. The wearable device may display the received contacts and ask for user input on whether to select and add one contact as a new contact of the user account on the social application.

The transfer device stores all contact accounts corresponding to the user accounts and a correspondence between the contact account and the contact information. In this case, the transfer device may detect, according to the correspondence, whether the transfer device stores the contact account that matches the contact information. When the transfer device stores the contact account that matches the contact information, sending, by the transfer device, the contact account to the wearable device, where the wearable device determines the contact account as a contact account of the target device that needs to receive the communication message. When the transfer device does not store the contact account that matches the contact information, the transfer device may send, to the wearable device, a notification message indicating that the contact account is not found, and the wearable device stops sending the communication message; or the transfer device may send an account query request to a contact indicated by the contact information, and after receiving the contact account sent by the contact, send the contact account to the wearable device, and the wearable device determines the contact account as a contact account of the target device that needs to receive the communication message.

For example, if the user inputs voice of "Xiao Ming" to the wearable device, the wearable device searches each contact account stored by the wearable device for a contact account corresponding to "Xiao Ming"; when finding the contact account "123456" corresponding to "Xiao Ming", determines the contact account as a contact account that needs to receive a communication message; when finding no contact account corresponding to "Xiao Ming", sends contact information to the transfer device. When finding the contact account "123456" corresponding to "Xiao Ming", the transfer device sends the contact account to the wearable device, and the wearable device determines the contact account as a contact account that needs to receive a communication message.

Step 704. The wearable device receives an input communication message.

The communication message may be a voice message, or may be a text message. Specifically, the receiving, by the wearable device, an input communication message includes: 1) detecting, by the wearable device, a reply instruction triggered by a user, where the reply instruction is a voice reply instruction or a text reply instruction; 2) receiving, by the wearable device, the input voice message when the instruction is a voice reply instruction; and 3) displaying, by the wearable device, a text message pre-stored in the wearable device, when the reply instruction is a text reply instruction, receiving a message selection instruction triggered on an interface of the wearable device, and obtaining a text message returned in response to the message selection instruction.

The wearable device may display options of a text sending manner and a voice sending manner on a receiving interface of the communication message; and if the user selects the option of the text sending manner, a text reply instruction is triggered; or if the user selects the option of the voice reply manner, a voice reply instruction is triggered.

When the wearable device receives the text reply instruction, because it is quite difficult to input a text into the wearable device, the wearable device may further pre-store at least one text message, and the user may select one text message from the at least one text message for reply. The text message may be preset in the transfer device by the user, and sent to the wearable device, or may be obtained from another device by the wearable device. This embodiment does not limit a source of the text message.

When the wearable device receives the voice reply instruction, the wearable device invokes a microphone for recording, and determines voice input by the user as a voice message.

Optionally, the wearable device may further use a default message sending manner, for example, the default message sending manner is a text sending manner or a voice sending manner, which is not limited in this embodiment.

Step 705. The wearable device sends the communication message and the identifier to the transfer device.

When the communication message is a voice message, the wearable device may directly send the voice message to the transfer device, or may convert the voice message into a text message and send the text message to the transfer device. This embodiment does not limit a manner of sending the voice message by the wearable device.

Step 706. The transfer device receives the communication message and the identifier of the target device that are sent by the wearable device.

When the communication message is a text message, the receiving, by the transfer device, the communication message and the identifier of the target device that are sent by the wearable device includes: receiving, by the transfer device, the text message and the identifier that are sent by the wearable device, where the text message is obtained, when the wearable device receives a text reply instruction, by selecting from pre-stored text messages in response to the text reply instruction, and the text reply instruction is a reply instruction triggered by a user.

Step 707. The transfer device determines the target device according to the identifier.

After receiving the voice message, no matter whether the transfer device is in a screen-on status or a lock screen status, the transfer device determines the target device according to the identifier.

Step 708. The transfer device forwards the communication message to the target device.

In conclusion, by means of the method for sending a communication message provided in this embodiment of the present disclosure, a communication message and an identifier are sent to a transfer device, and the transfer device determines a target device according to the identifier, and sends the communication message to the target device. When the transfer device meets a predetermined condition, it may be determined that it is inconvenient for a user to operate the electronic device; in this case, the user sends the communication message by using a worn wearable device, thereby resolving a problem that the user cannot send the communication message in time when it is inconvenient to operate the electronic device, and achieving an effect of improving communication efficiency.

In addition, a communication connection is established to the transfer device; and a user account sent by the transfer device is received by means of the communication connection, and the user account is logged in to the wearable device, where the user account may be directly sent to the wearable device, thereby avoiding a problem that the user account cannot be accurately input because a display screen of the wearable device is excessively small, and achieving an effect of improving accuracy of obtaining the user account.

Figure 8:
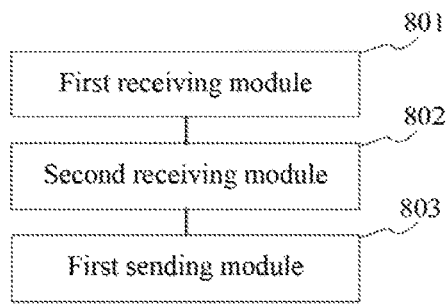
FIG. 8 is a structural block diagram of an apparatus for sending a communication message according to an embodiment of the present disclosure.

Referring to FIG. 8, FIG. 8 shows a structural block diagram of an apparatus for sending a communication message according to an embodiment of the present disclosure. The apparatus for sending a communication message may be applied to the wearable device 120 shown in FIG. 1. The apparatus for sending a communication message includes: a first receiving module 801, configured to receive a communication message sent by a transfer device, where the communication message is sent to the transfer device by a target device, and is forwarded to a wearable device by the transfer device when the transfer device meets a predetermined condition; a second receiving module 802, configured to receive a reply message input for the communication message received by the first receiving module 801; and a first sending module 803, configured to send the reply message receives by the second receiving module 802 to the transfer device, where the reply message is forwarded to the target device by the transfer device.

In conclusion, the apparatus for sending a communication message provided in this embodiment of the present disclosure receives a communication message sent by a transfer device, where the communication message is sent to the transfer device by a target device, and is forwarded to a wearable device by the transfer device when the transfer device meets a predetermined condition; receives a reply message input for the communication message; and sends the reply message to the transfer device, where the reply message is forwarded to the target device by the transfer device. When the transfer device meets the predetermined condition, it may be determined that it is inconvenient for a user to operate the electronic device; in this case, the user replies to the communication message by using a worn wearable device, thereby resolving a problem that the user cannot reply to the communication message in time when it is inconvenient to operate the electronic device, and achieving an effect of improving communication efficiency.

Figure 9:
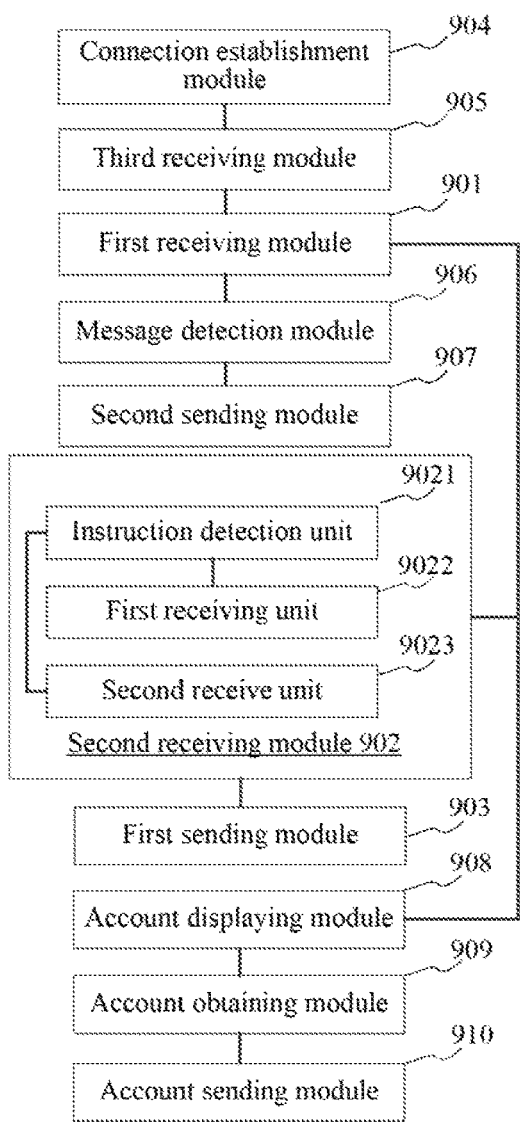
FIG. 9 is a structural block diagram of an apparatus for sending a communication message according to another embodiment of the present disclosure.

Referring to FIG. 9, FIG. 9 shows a structural block diagram of an apparatus for sending a communication message according to another embodiment of the present disclosure. The apparatus for sending a communication message may be applied to the wearable device 120 shown in FIG. 1. The apparatus for sending a communication message includes: a first receiving module 901, configured to receive a communication message sent by a transfer device, where the communication message is sent to the transfer device by a target device, and is forwarded to a wearable device by the transfer device when the transfer device meets a predetermined condition; a second receiving module 902, configured to receive a reply message input for the communication message received by the first receiving module 901; and a first sending module 903, configured to send the reply message received by the second receiving module 902 to the transfer device, where the reply message is forwarded to the target device by the transfer device.

Optionally, the apparatus further includes: a connection establishment module 904, configured to establish a communication connection to the transfer device before the first receiving module 901 receives the communication message sent by the transfer device; and a third receiving module 905, configured to receive, by means of the communication connection established by the connection establishment module 904, a user account sent by the transfer device, and log in the user account to the wearable device, where the user account is an account used for performing communication by another device.

Optionally, the predetermined condition is: 1) an interface currently displayed by the transfer device is not a display interface of the communication message; or 2) an interface currently displayed by the transfer device is not a display interface of a social application corresponding to the communication message; or the transfer device is currently in a lock screen status and a control switch in the transfer device is in a predetermined status, where the predetermined status is used for indicating that the transfer device is allowed to send the communication message to the wearable device; or a first historical message sent by the wearable device is received within a first time period, where an end moment of the first time period is a moment at which the transfer device receives the communication message, and the first historical message is a reply message obtained by the wearable device according to a communication message received at a historical moment, or the first historical message is a communication message sent by the wearable device at a historical moment; or a second historical message is sent to the wearable device within a second time period, where an end moment of the second time period is a moment at which the transfer device receives the communication message, and the second historical message is a communication message received by the wearable device at a historical moment; or the transfer device is running a predetermined service application.

Optionally, the apparatus further includes: a message detection module 906, configured to start timing when the communication message is received, and detect whether the input reply message is received within a third time period from the starting of the timing; and a second sending module 907, configured to send a predetermined reply message to the transfer device when the message detection module 906 detects that the reply message is not received within the third time period, where the predetermined reply message is forwarded to the target device by the transfer device, and the predetermined reply message is a voice message or a text message.

Optionally, the second receiving module 902 includes: an instruction detection unit 9021, configured to detect a reply instruction triggered by a user, where the reply instruction is a voice reply instruction or a text reply instruction; a first receiving unit 9022, configured to receive, when the instruction detection unit 9021 detects that the reply instruction is a voice reply instruction, a voice message input for the communication message; and a second receive unit 9023, configured to: display, when the instruction detection unit 9021 detects that the reply instruction is a text reply instruction, a text message pre-stored in the wearable device, receive a message selection instruction triggered by the user, and obtain a text message returned in response to the message selection instruction.

Optionally, the apparatus further includes: an account displaying module 908, configured to display contact accounts stored in the wearable device; an account obtaining module 909, configured to receive an account selection instruction, and obtain a contact account returned in response to the account selection instruction; and an account sending module 910, configured to send the contact account obtained by the account obtaining module 909 to the transfer device, where the contact account is used for instructing the transfer device: when receiving a communication message sent by the contact account, to skip forwarding the communication message to the wearable device.

In conclusion, the apparatus for sending a communication message provided in this embodiment of the present disclosure receives a communication message sent by a transfer device, where the communication message is sent to the transfer device by a target device, and is forwarded to a wearable device by the transfer device when the transfer device meets a predetermined condition; receives a reply message input for the communication message; and sends the reply message to the transfer device, where the reply message is forwarded to the target device by the transfer device. When the transfer device meets the predetermined condition, it may be determined that it is inconvenient for a user to operate the electronic device; in this case, the user replies to the communication message by using a worn wearable device, thereby resolving a problem that the user cannot reply to the communication message in time when it is inconvenient to operate the electronic device, and achieving an effect of improving communication efficiency.

In addition, a communication connection is established to the transfer device; and a user account sent by the transfer device is received by means of the communication connection, and the user account is logged in to the wearable device, where the user account may be directly sent to the wearable device, thereby avoiding a problem that the user account cannot be accurately input because a display screen of the wearable device is excessively small, and achieving an effect of improving accuracy of obtaining the user account.

Figure 10:
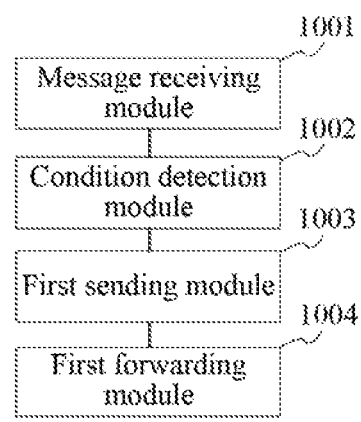
FIG. 10 is a structural block diagram of an apparatus for sending a communication message according to an embodiment of the present disclosure.

Referring to FIG. 10, FIG. 10 shows a structural block diagram of an apparatus for sending a communication message according to an embodiment of the present disclosure. The apparatus for sending a communication message may be applied to the transfer device 140 shown in FIG. 1. The apparatus for sending a communication message includes: a message receiving module 1001, configured to receive a communication message sent by a target device; a condition detection module 1002, configured to detect whether a transfer device meets a predetermined condition; a first sending module 1003, configured to forward the communication message to a wearable device when the condition detection module 1002 detects that the transfer device meets the predetermined condition; and a first forwarding module 1004, configured to receive a reply message sent by the wearable device, and forward the reply message to the target device, where the reply message is input to the wearable device for the communication message.

In conclusion, the apparatus for sending a communication message provided in this embodiment of the present disclosure forwards a communication message to a wearable device when a transfer device meets a predetermined condition; and receives a reply message sent by the wearable device, and forwards the reply message to a target device. When the transfer device meets the predetermined condition, it may be determined that it is inconvenient for a user to operate the electronic device; in this case, the user replies to the communication message by using a worn wearable device, thereby resolving a problem that the user cannot reply to the communication message in time when it is inconvenient to operate the electronic device, and achieving an effect of improving communication efficiency.

Figure 11:
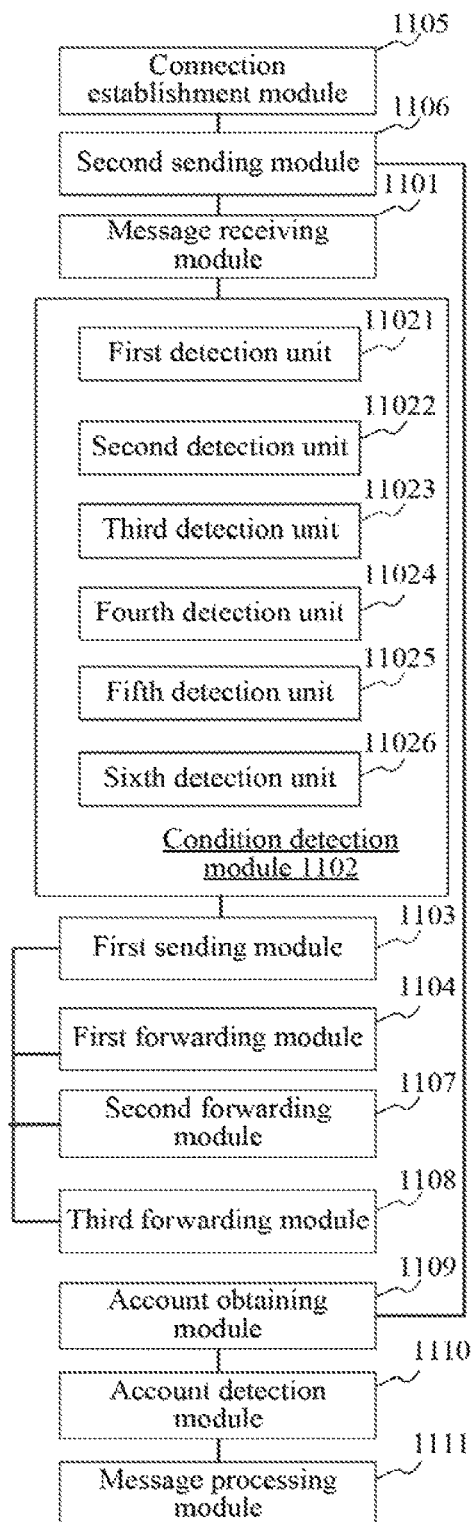
FIG. 11 is a structural block diagram of an apparatus for sending a communication message according to another embodiment of the present disclosure.

Referring to FIG. 11, FIG. 1I shows a structural block diagram of an apparatus for sending a communication message according to another embodiment of the present disclosure. The apparatus for sending a communication message may be applied to the transfer device 140 shown in FIG. 1. The apparatus for sending a communication message includes: a message receiving module 1101, configured to receive a communication message sent by a target device; a condition detection module 1102, configured to detect whether a transfer device meets a predetermined condition; a first sending module 1103, configured to forward the communication message to a wearable device when the condition detection module 1102 detects that the transfer device meets the predetermined condition; and a first forwarding module 1104, configured to receive a reply message sent by the wearable device, and forward the reply message to the target device, where the reply message is input to the wearable device for the communication message.

Optionally, the apparatus further includes: a connection establishment module 1105, configured to establish a communication connection to the wearable device before the first sending module sends the communication message to the wearable device; and a second sending module 1106, configured to send a user account to the wearable device by means of the communication connection established by the connection establishment module 1105, where the wearable device logs in the user account, and the user account is an account used for performing communication by another device.

Optionally, the condition detection module 1102 includes: a first detection unit 11021, configured to detect whether an interface currently displayed by the transfer device is a display interface of the communication message; or a second detection unit 11022, configured to detect whether an interface currently displayed by the transfer device is a display interface of a social application corresponding to the communication message; or a third detection unit 11023, configured to detect whether the transfer device is currently in a lock screen status, and detect whether a control switch in the transfer device is in a predetermined status, where the predetermined status is used for indicating that the transfer device is allowed to send the communication message to the wearable device; or a fourth detection unit 11024, configured to detect whether the transfer device receives, within a first time period, a first historical message sent by the wearable device, where an end moment of the first time period is a moment at which the transfer device receives the communication message, and the first historical message is obtained by the wearable device according to a communication message received at a historical moment; or a fifth detection unit 11025, configured to detect whether the transfer device has sent a second historical message to the wearable device within a second time period, where an end moment of the second time period is a moment at which the transfer device receives the communication message, and the second historical message is a communication message received by the wearable device at a historical moment; or a sixth detection unit 11026, configured to detect whether the transfer device is running a predetermined service application.

Optionally, the apparatus further includes: a second forwarding module 1107, configured to receive a predetermined reply message sent by the wearable device, and forward the predetermined reply message to the target device, where the predetermined reply message is a voice message or a text message, the predetermined reply message is starting timing when the wearable device receives the communication message, and is sent after an input reply message is not received within a third time period from the starting of the timing.

Optionally, the apparatus further includes: a third forwarding module 1108, configured to: after the first sending module 1103 forwards the communication message to the wearable device, receive a text message sent by the wearable device, and send the text message to the target device, where the text message is obtained, when the wearable device receives a text reply instruction, by selecting from pre-stored text messages in response to the text reply instruction, and the text reply instruction is a reply instruction triggered by a user.

Optionally, the apparatus further includes: an account obtaining module 1109, configured to obtain a contact account that sends the communication message; an account detection module 1110, configured to detect whether contact accounts previously sent by the wearable device include the contact account obtained by the account obtaining module; and a message processing module 1111, configured to skip forwarding the communication message to the wearable device when the account detection module 1110 detects that the contact accounts previously sent by the wearable device include the contact account.

In conclusion, the apparatus for sending a communication message provided in this embodiment of the present disclosure forwards a communication message to a wearable device when a transfer device meets a predetermined condition; and receives a reply message sent by a wearable device, and forwards the reply message to a target device. When the transfer device meets the predetermined condition, it may be determined that it is inconvenient for a user to operate the electronic device; in this case, the user replies to the communication message by using a worn wearable device, thereby resolving a problem that the user cannot reply to the communication message in time when it is inconvenient to operate the electronic device, and achieving an effect of improving communication efficiency.

In addition, a communication connection is established to the wearable device; and a user account is sent to the wearable device by means of the communication connection, where the user account may be directly sent to the wearable device, thereby avoiding a problem that the user account cannot be accurately input because a display screen of the wearable device is excessively small, and achieving an effect of improving accuracy of obtaining the user account.

Figure 12:
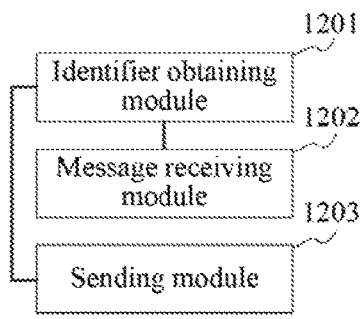
FIG. 12 is a structural block diagram of an apparatus for sending a communication message according to an embodiment of the present disclosure.

Referring to FIG. 12, FIG. 12 shows a structural block diagram of an apparatus for sending a communication message according to an embodiment of the present disclosure. The apparatus for sending a communication message may be applied to the wearable device 120 shown in FIG. 1. The apparatus for sending a communication message includes: an identifier obtaining module 1201, configured to obtain an identifier of a target device; a message receiving module 1202, configured to receive an input communication message; and a sending module 1203, configured to send the communication message received by the message receiving module 1202 and the identifier obtained by the identifier obtaining module 1201 to the transfer device, where the transfer device is configured to determine a target device according to the identifier, and forward the communication message to the target device.

In conclusion, the apparatus for sending a communication message provided in this embodiment of the present disclosure send a communication message and an identifier to a transfer device, where the transfer device is configured to determine a target device according to the identifier, and forward the communication message to the target device. When the transfer device meets a predetermined condition, it may be determined that it is inconvenient for a user to operate the electronic device; in this case, the user sends the communication message by using a worn wearable device, thereby resolving a problem that the user cannot send the communication message in time when it is inconvenient to operate the electronic device, and achieving an effect of improving communication efficiency.

Figure 13:
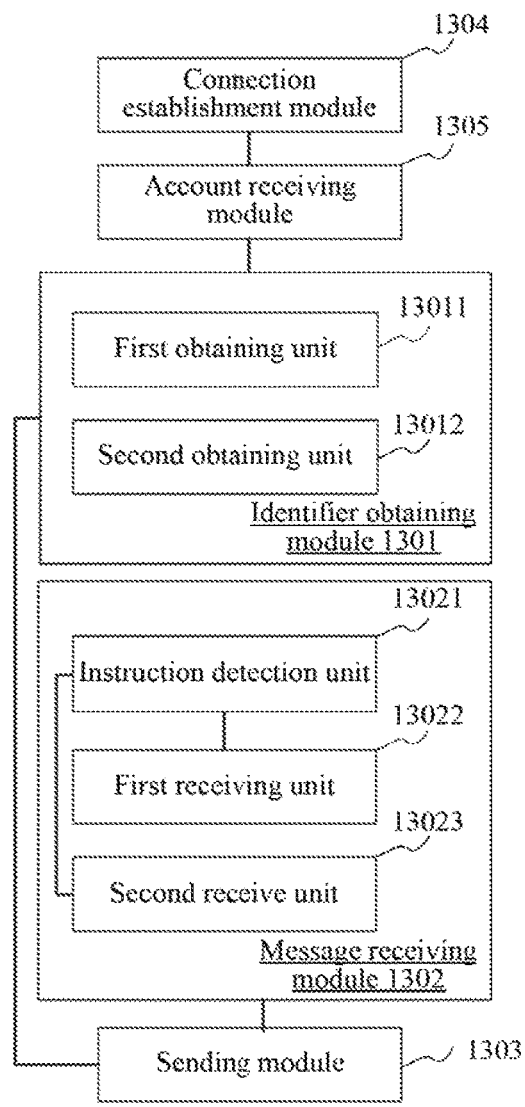
FIG. 13 is a structural block diagram of an apparatus for sending a communication message according to another embodiment of the present disclosure.

Referring to FIG. 13, FIG. 13 shows a structural block diagram of an apparatus for sending a communication message according to another embodiment of the present disclosure. The apparatus for sending a communication message may be applied to the wearable device 120 shown in FIG. 1. The apparatus for sending a communication message includes: an identifier obtaining module 1301, configured to obtain an identifier of a target device; a message receiving module 1302, configured to receive an input communication message, and a sending module 1303, configured to send the communication message received by the message receiving module 1302 and the identifier obtained by the identifier obtaining module 1301 to the transfer device, where the transfer device is configured to determine the target device according to the identifier, and forward the communication message to the target device.

Optionally, the apparatus further includes: a connection establishment module 1304, configured to establish a communication connection to the transfer device before the sending module 1303 sends the communication message and the identifier to the transfer device; and an account receiving module 1305, configured to receive, by means of the communication connection, a user account sent by the transfer device, and log in the user account to a wearable device, where the user account is an account used for performing communication by another device.

Optionally, when the identifier is a contact account, the identifier obtaining module 1301 includes: a first obtaining unit 13011, configured to display contact accounts that are of target devices and that are stored in the wearable device, receive an account selection instruction, and determine a contact account returned in response to the account selection instruction as a contact account of the target device; or a second obtaining unit 13012, configured to receive input contact information, and detect whether the wearable device stores a contact account that matches the contact information; when the wearable device stores the contact account that matches the contact information, determine the contact account as a contact account of the target device; or when the wearable device does not store the contact account that matches the contact information, send the contact information to the transfer device, receive the contact account that matches the contact information and that is sent by the transfer device, and determine the contact account as a contact account of the target device.

Optionally, the message receiving module 1302 includes: an instruction detection unit 13021, configured to detect a reply instruction triggered by a user, where the reply instruction is a voice reply instruction or a text reply instruction; a first receiving unit 13022, configured to receive an input voice message when the reply instruction received by the instruction detection unit 13021 is a voice reply instruction; and a second receive unit 13023, configured to display, when the reply instruction received by the instruction detection unit 13021 is a text reply instruction, a text message pre-stored in the wearable device, receive a message selection instruction triggered by the user, and obtain a text message returned in response to the message selection instruction.

In conclusion, the apparatus for sending a communication message provided in this embodiment of the present disclosure send a communication message and an identifier to a transfer device, where the transfer device is configured to determine a target device according to the identifier, and forward the communication message to the target device. When the transfer device meets a predetermined condition, it may be determined that it is inconvenient for a user to operate the electronic device; in this case, the user sends the communication message by using a worn wearable device, thereby resolving a problem that the user cannot send the communication message in time when it is inconvenient to operate the electronic device, and achieving an effect of improving communication efficiency.

In addition, a communication connection is established to the transfer device, and a user account sent by the transfer device is received by means of the communication connection, and the user account is logged in to the wearable device, where the user account may be directly sent to the wearable device, thereby avoiding a problem that the user account cannot be accurately input because a display screen of the wearable device is excessively small, and achieving an effect of improving accuracy of obtaining the user account.

Figure 14:
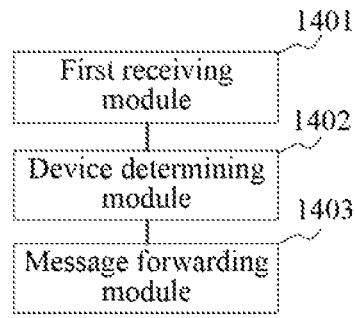
FIG. 14 is a structural block diagram of an apparatus for sending a communication message according to an embodiment of the present disclosure.

Referring to FIG. 14, FIG. 14 shows a structural block diagram of an apparatus for sending a communication message according to an embodiment of the present disclosure. The apparatus for sending a communication message may be applied to the transfer device 140 shown in FIG. 1. The apparatus for sending a communication message includes: a first receiving module 1401, configured to receive a communication message and an identifier of a target device that are sent by a wearable device; a device determining module 1402, configured to determine the target device according to the identifier received by the first receiving module 1401; and a message forwarding module 1403, configured to forward the communication message to the target device determined by the device determining module 1402.

In conclusion, the apparatus for sending a communication message provided in this embodiment of the present disclosure receives a communication message and an identifier of a target device that are sent by a wearable device, determines the target device according to the identifier, and forwards the communication message to the target device. When a transfer device meets a predetermined condition, it may be determined that it is inconvenient for a user to operate the electronic device; in this case, the user sends the communication message by using a worn wearable device, thereby resolving a problem that the user cannot send the communication message in time when it is inconvenient to operate the electronic device, and achieving an effect of improving communication efficiency.

Figure 15:
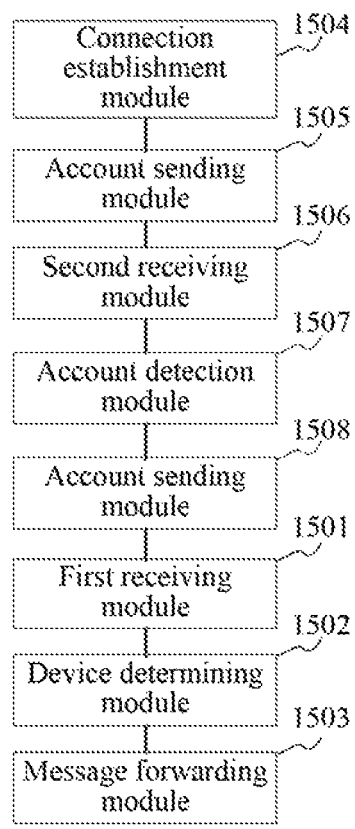
FIG. 15 is a structural block diagram of an apparatus for sending a communication message according to another embodiment of the present disclosure.

Referring to FIG. 15, FIG. 15 shows a structural block diagram of an apparatus for sending a communication message according to another embodiment of the present disclosure. The apparatus for sending a communication message may be applied to the transfer device 140 shown in FIG. 1, including: a first receiving module 1501, configured to receive a communication message and an identifier of a target device that are sent by a wearable device; a device determining module 1502, configured to determine the target device according to the identifier received by the first receiving module 1501; and a message forwarding module 1503, configured to forward the communication message to the target device determined by the device determining module 1502.

Optionally, the apparatus further includes: a connection establishment module 1504, configured to establish a communication connection to the wearable device before the first receiving module 1501 receives the communication message and the identifier of the target device that are sent by the wearable device; and an account sending module 1505, configured to send a user account to the wearable device by means of the communication connection, where the wearable device logs in the user account, and the user account is an account used for performing communication by another device.

Optionally, when the identifier is a contact account, the apparatus further includes: a second receiving module 1506, configured to receive contact information sent by the wearable device before the first receiving module 1501 receives the communication message and the identifier of the target device that are sent by the wearable device, where the contact information is sent to the transfer device when the wearable device does not store a contact account that matches the contact information; an account detection module 1507, configured to detect whether the transfer device store a contact account that matches the contact information received by the second receiving module; and an account sending module 1508, configured to send the contact account to the wearable device when the account detection module 1507 detects that the transfer device stores the contact account that matches the contact information, where the wearable device determines the contact account as a contact account of the target device.

Optionally, the first receiving module 1501 is specifically configured to receive a text message and an identifier that are sent by the wearable device, where the text message is obtained, when the wearable device receives a text reply instruction, by selecting from pre-stored text messages in response to the text reply instruction, and the text reply instruction is a reply instruction triggered by a user.

In conclusion, the apparatus for sending a communication message provided in this embodiment of the present disclosure receive a communication message and an identifier of a target device that are sent by a wearable device, determines the target device according to the identifier, and forwards the communication message to the target device. When a transfer device meets a predetermined condition, it may be determined that it is inconvenient for a user to operate the electronic device; in this case, the user sends the communication message by using a worn wearable device, thereby resolving a problem that the user cannot send the communication message in time when it is inconvenient to operate the electronic device, and achieving an effect of improving communication efficiency.

In addition, a communication connection is established to the wearable device; and a user account is sent to the wearable device by means of the communication connection, where the user account may be directly sent to the wearable device, thereby avoiding a problem that the user account cannot be accurately input because a display screen of the wearable device is excessively small, and achieving an effect of improving accuracy of obtaining the user account.

Figure 16:
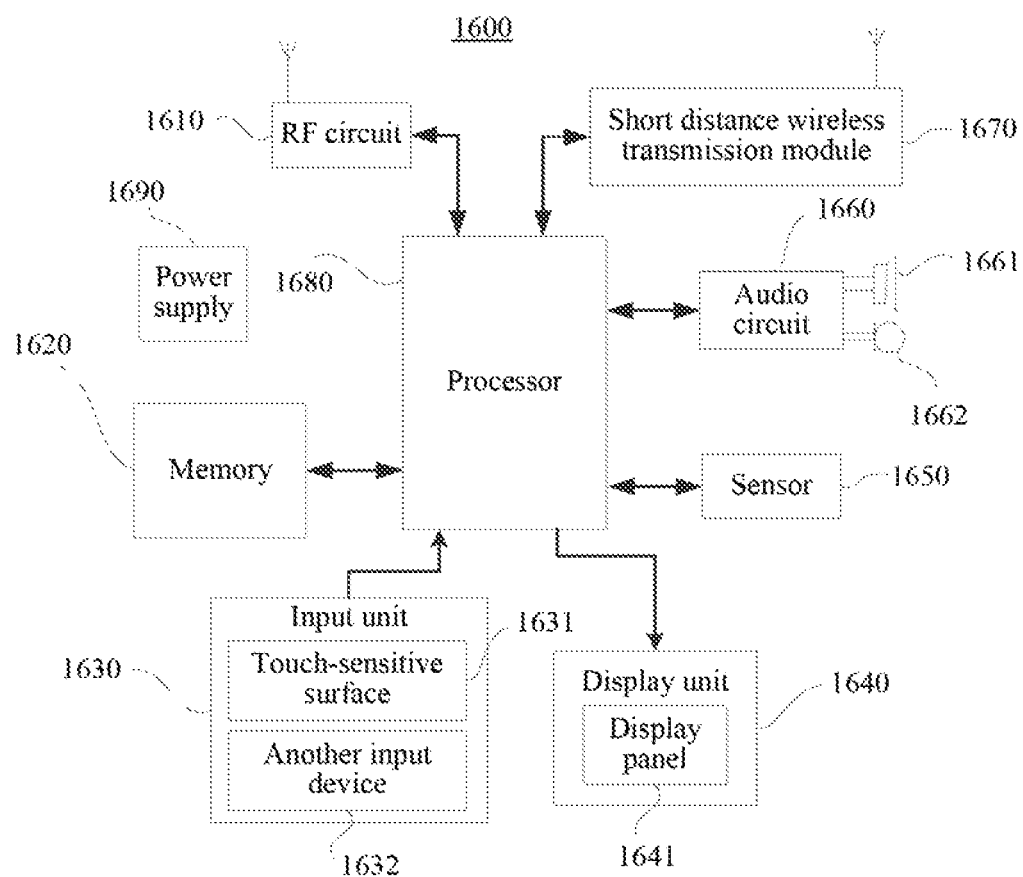
FIG. 16 is a structural block diagram of a communication apparatus according to an embodiment of the present disclosure.

Referring to FIG. 16, FIG. 16 shows a schematic structural diagram of a communication apparatus according to an embodiment of the present disclosure. The communication apparatus 1600 may be a wearable device or a transfer device. Specifically:

The communication apparatus 1600 may include components such as a radio frequency (RF) circuit 1610, a memory 1620 including one or more computer readable storage media, an input unit 1630, a display unit 1640, a sensor 1650, an audio circuit 1660, a short distance wireless transmission module 1670, a processor 1680 including one or more processing cores, and a power supply 1690. A person skilled in the art may understand that a terminal structure shown in FIG. 16 constitutes no limitation to the communication apparatus, and the communication apparatus may include more or fewer components than those shown in the figure, or some components may be combined, or a different component deployment may be used.

The RF circuit 1610 may be configured to receive and send a communication message. Generally, the RF circuit 1610 includes, but is not limited to, an antenna, at least one amplifier, a tuner, one or more oscillators, a transceiver, a coupler, a low noise amplifier (LNA), and a duplexer. In addition, the RF circuit 1610 may also communicate with a network and another device by wireless communication. The wireless communication may use any communications standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like.

The memory 1620 may be configured to store a software program and a module, for example, the memory 1620 may be configured to store a user account, or may be configured to store a contact account, or may be configured to store a predetermined reply message, or may be configured to store a text message, or may be configured to store a software program for collecting a voice signal, a software program for implementing keyword identification, a software program for implementing continuous voice identification, or the like.

The processor 1680 execute various function applications and data processing by running the software program and the module stored in the memory 1620. The memory 1620 may mainly include a program storage area and a data storage area. The program storage area may store an operating system, an application program required by at least one function, and the like. The data storage area may store data created according to use of the communication apparatus 1600, and the like. In addition, the memory 1620 may include a high speed random access memory, and may also include a non-volatile memory such as at least one magnetic disk storage device, a flash memory, or another volatile solid-state storage device. Correspondingly, the memory 1620 may further include a memory controller, so as to provide and control access of the processor 1680 and the input unit 1630 to the memory 1620.

The input unit 1630 may be configured to receive input digit or character information. Specifically, the input unit 1630 may include a touch-sensitive surface 1631 and another input device 1632. The touch-sensitive surface 1631, which may also be referred to as a touch screen or a touch panel, may collect a touch operation of a user on or near the touch-sensitive surface (such as an operation of a user on or near the touch-sensitive surface 1631 by using any suitable object or accessory, such as a finger or a stylus), and drive a corresponding connection apparatus according to a preset program. Optionally, the touch-sensitive surface 1631 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 1680. Moreover, the touch controller can receive and execute a command sent from the processor 1680. In addition, the touch-sensitive surface 1631 may be a resistive, capacitive, infrared, or surface sound wave type touch-sensitive surface. In addition to the touch-sensitive surface 1631, the input unit 1630 may further include other input device(s) 1632. Specifically, the input device(s) 1632 may include, but is not limited to a functional key (such as a volume control key or a switch key).

The display unit 1640 may be configured to display information input by the user or information provided for the user, and various graphical user interfaces of the communication apparatus 1600. The display unit 1640 may include a display panel 1641, and optionally, the display panel 1641 may be configured by using a form such as a liquid crystal display (LCD) or organic light-emitting diode (OLED). Further, the touch-sensitive surface 1661 may cover the display panel 1641. After detecting a touch operation on or near the touch-sensitive surface 1661, the touch-sensitive surface 1641 transfers the touch operation to the processor 1680, so as to determine the type of the touch event. Although, in FIG. 16, the touch panel 1661 and the display panel 1641 are used as two separate pans to implement input and output functions, in some embodiments, the touch panel 1661 and the display panel 1641 may be integrated to implement the input and output functions.

The communication apparatus 1600 may further include at least one sensor 1650, for example, an optical sensor, a motion sensor and other sensors. Specifically, the optical sensor may include an ambient light sensor and a proximity sensor. The ambient light sensor can adjust luminance of the display panel 1641 according to brightness of the ambient light. The proximity sensor may switch off the display panel 1641 and/or backlight when the communication apparatus 1600 is moved to the ear. As one type of motion sensor, a gravity acceleration sensor may detect magnitude of accelerations in various directions (generally on three axes), may detect magnitude and a direction of the gravity when static, and may be configured to identify an application of a mobile phone gesture (such as switchover between horizontal and vertical screens, a related game, and gesture calibration of a magnetometer), a function related to vibration recognition (such as a pedometer and a knock), and the like. Other sensors, such as a gyroscope, a barometer, a hygrometer, a thermometer, and an infrared sensor, which may be configured in the communication apparatus 1600 are not further described herein.

The audio circuit 1660, a loudspeaker 1661, and a microphone 1662 may provide audio interfaces between the user and the communication apparatus 1600. The audio circuit 1660 may convert received audio data into an electric signal and transmit the electric signal to the loudspeaker 1661. The loudspeaker 1661 converts the electric signal into a sound signal for output. On the other hand, the microphone 1662 converts a collected sound signal into an electric signal. The audio circuit 1660 receives the electric signal and converts the electric signal into audio data, and outputs the audio data to the processor 1680 for processing. Then, the processor 1680 sends the audio data to, for example, another mobile communication apparatus by using the RF circuit 1610, or outputs the audio data to the memory 1620 for further processing. The audio circuit 1660 may further include an earplug jack, so as to provide communication between a peripheral earphone and the communication apparatus 1600.

The short distance wireless transmission module 1670 may be a WiFi module, a Bluetooth module, or the like. The communication apparatus 160) may help, by using the short distance wireless transmission module 1670, a user to receive and send a communication message, or the like.

The processor 1680 is a control center of the communication apparatus 1600, and is connected to various parts of the mobile communication apparatus by using various lines. By running or executing the software program and/or module stored in the memory 1620, and invoking data stored in the memory 1620, the processor 1680 performs various functions and data processing of the communication apparatus 1600, thereby performing overall monitoring on the mobile communication apparatus. Optionally, the processor 1680 may include the one or more processing cores. Optionally, the processor 1680 may integrate an application processor and a modem. The application processor mainly processes an operating system, a user interface, an application program, and the like. The modem mainly processes wireless communication. It may be understood that the foregoing modem processor may be not integrated into the processor 1680.

The communication apparatus 1600 may further include the power supply 1690 (for example, a battery) that supplies power for various components. Preferably, the power supply may be logically connected to the processor 1680 by using a power management system, so as to implement a function such as charging, discharging and power consumption management by using the power management system. The power supply 1690 may further include one or more of a direct current or alternate current power supply, a re-charging system, a power supply fault detection circuit, a power supply converter or an inverter, a power supply state indicator, and any other components.

Although not shown in the figure, the communication apparatus 1600 may further include a camera, and the like, which are not further described herein.

The communication apparatus 1600 further includes a memory and one or more programs. The one or more programs are stored in the memory and configured to be executed by one or more processors to execute the communication message method according to the foregoing embodiments.

In an exemplary embodiment, a non-temporary computer readable storage medium including an instruction, such as a memory including an instruction, is further provided, where the foregoing instruction may be executed by a processor of a wearable device to implement the foregoing method for sending a communication message, or the foregoing instruction may be executed by a processor of a transfer device to implement the foregoing method for sending a communication message. For example, the non-temporary computer readable storage medium may be a ROM, a random access memory (RAM), a CD-ROM, a magnetic tape, a floppy disk, an optical data storage device, or the like.

It should be noted that divisions of the above functional modules are only described for exemplary purposes when the apparatus for sending a communication message provided in the foregoing embodiment sends a communication message. In actual applications, the functions may be allocated to different functional modules according to specific needs, which means that the internal structure of the apparatus for sending a communication message is divided to different functional modules to complete all or some of the above described functions. In addition, the apparatuses for sending a communication message provided in the foregoing embodiments are based on the same concept as the methods for sending a communication message in the foregoing embodiments. For the specific implementation process, refer to the method embodiments, and details are not described herein again.

The sequence numbers of the foregoing embodiments of the present disclosure are merely for the convenience of description, and do not imply the preference among the embodiments.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

The foregoing descriptions are merely preferred embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A method for sending a communication message, comprising:
   setting an application list in a transfer device storing at least one predetermined service application, wherein the application list comprises a navigation application;
   determining that the transfer device meets a predetermined condition when the transfer device is running the navigation application in a lock screen status;
   when the transfer device is in the lock screen status, receiving, by a wearable device, an incoming communication message sent by the transfer device, wherein the incoming communication message is sent to the transfer device by a first target device, and is forwarded to the wearable device by the transfer device when the transfer device meets the predetermined condition and is in the lock screen status;
   receiving, by the wearable device, a voice reply message input by a user for the incoming communication message; and
   sending, by the wearable device, the voice reply message to the transfer device without changing the lock screen status of the transfer device, wherein the voice reply message is forwarded to the first target device by the transfer device.

2. The method according to claim 1, wherein the predetermined condition further comprises:
an interface currently displayed by the transfer device is not a display interface of the incoming communication message; or
an interface currently displayed by the transfer device is not a display interface of a social application corresponding to the incoming communication message; or
the transfer device is currently in the lock screen status and a control switch in the transfer device is in a predetermined status, wherein the predetermined status is used for indicating that the transfer device is allowed to send the incoming communication message to the wearable device; or
a first historical message sent by the wearable device is received within a first time period, wherein an end moment of the first time period is a moment at which the transfer device receives the incoming communication message, and the first historical message is a historical voice reply message obtained by the wearable device according to a communication message received at a historical moment, or the first historical message is a communication message sent by the wearable device at the historical moment; or
a second historical message is sent to the wearable device within a second time period, wherein an end moment of the second time period is a moment at which the transfer device receives the incoming communication message, and the second historical message is a communication message received by the wearable device at the historical moment.

3. The method according to claim 1, further comprising:
starting timing when receiving the incoming communication message;
detecting, by the wearable device, whether the input voice reply message is received within a third time period from the starting of the timing; and
sending, by the wearable device, a predetermined voice reply message to the transfer device when the voice reply message is not received within the third time period, wherein the predetermined voice reply message is forwarded to the first target device by the transfer device.

4. The method according to claim 1, wherein the method further comprises:
displaying, by the wearable device, contact accounts stored in the wearable device;
receiving, by the wearable device, an account selection instruction, and obtaining a contact account returned in response to the account selection instruction; and
sending, by the wearable device, the obtained contact account to the transfer device, wherein the contact account is used for instructing the transfer device: when receiving a communication message sent by the contact account, to skip forwarding the communication message to the wearable device.

5. The method according to claim 1, further comprising:
obtaining, by the wearable device, an identifier of a second target device;
receiving, by the wearable device, an outgoing communication message based on user input; and
sending, by the wearable device, the outgoing communication message and the identifier to the transfer device, wherein the transfer device is configured to determine the second target device according to the identifier, and forward the outgoing communication message to the second target device.

6. The method according to claim 5, wherein before the receiving, by a wearable device, an incoming communication message sent by a transfer device, or before the sending, by the wearable device, the outgoing communication message and the identifier to the transfer device, the method further comprises:
establishing, by the wearable device, a communication connection to the transfer device; and
receiving, by the wearable device, a user account sent by the transfer device by means of the communication connection, and logging in the user account to the wearable device, wherein the user account is an account used for performing communication by another device.

7. The method according to claim 5, wherein when the identifier is a contact account, the obtaining, by the wearable device, an identifier of a second target device comprises:
displaying, by the wearable device, contact accounts of target devices stored in the wearable device, receiving an account selection instruction, and determining a contact account returned in response to the account selection instruction as a contact account of the second target device; or
receiving, by the wearable device, input contact information, and detecting whether the wearable device stores a contact account that matches the contact information; when the wearable device stores the contact account that matches the contact information, determining the contact account as a contact account of the second target device; or when the wearable device does not store the contact account that matches the contact information, sending the contact information to the transfer device, receiving the contact account that matches the contact information and that is sent by the transfer device, and determining the contact account as a contact account of the second target device.

8. The method according to claim 5, wherein the receiving, by the wearable device, the outgoing communication message or the reply message input for the incoming communication message comprises:
detecting, by the wearable device, a voice reply instruction triggered by a user;
receiving, by the wearable device, an input voice message, the input voice message being the outgoing communication message or the voice reply message input by the user for the incoming communication message.

9. A wearable device, comprising:
one or more processors; and
a memory, wherein
the memory stores one or more programs, wherein the one or more programs are configured to be executed by the one or more processors, and the one or more programs comprise instructions used for performing the following operations:
setting an application list in a transfer device storing at least one predetermined service application, wherein the application list comprises a navigation application;
determining that the transfer device meets a predetermined condition when the transfer device is running the navigation application in a lock screen status;
when the transfer device is in the lock screen status, receiving an incoming communication message sent by the transfer device, wherein the incoming communication message is sent to the transfer device by a first target device, and is forwarded to the wearable device by the transfer device when the transfer device meets the predetermined condition and is in the lock screen status;

receiving a voice reply message input by a user for the incoming communication message; and sending the voice reply message to the transfer device without changing the lock screen status of the transfer device, wherein the voice reply message is forwarded to the first target device by the transfer device.

10. The wearable device according to claim 9, wherein the predetermined condition further comprises:

an interface currently displayed by the transfer device is not a display interface of the incoming communication message; or an interface currently displayed by the transfer device is not a display interface of a social application corresponding to the incoming communication message; or the transfer device is currently in the lock screen status and a control switch in the transfer device is in a predetermined status, wherein the predetermined status is used for indicating that the transfer device is allowed to send the incoming communication message to the wearable device; or a first historical message sent by the wearable device is received within a first time period, wherein an end moment of the first time period is a moment at which the transfer device receives the incoming communication message, and the first historical message is a historical voice reply message obtained by the wearable device according to a communication message received at a historical moment, or the first historical message is a communication message sent by the wearable device at the historical moment; or a second historical message is sent to the wearable device within a second time period, wherein an end moment of the second time period is a moment at which the transfer device receives the incoming communication message, and the second historical message is a communication message received by the wearable device at the historical moment.

11. The wearable device according to claim 9, wherein the one or more programs comprise instructions used for performing the following operations:

starting timing when receiving the incoming communication message;

detecting whether the input voice reply message is received within a third time period from the starting of the timing; and sending a predetermined voice reply message to the transfer device when the reply message is not received within the third time period, wherein the predetermined voice reply message is forwarded to the first target device by the transfer device.

12. The wearable device according to claim 9, wherein the one or more programs comprise instructions used for performing the following operations:

displaying contact accounts stored in the wearable device;

receiving an account selection instruction, and obtaining a contact account returned in response to the account selection instruction; and sending the obtained contact account to the transfer device, wherein the contact account is used for instructing the transfer device: when receiving a communication message sent by the contact account, to skip forwarding the communication message to the wearable device.

13. The wearable device according to claim 9, wherein the one or more programs further comprise instructions used for performing:

obtaining an identifier of a second target device;

receiving an outgoing communication message based on user input; and sending the outgoing communication message and the identifier to the transfer device, wherein the transfer device is configured to determine the second target device according to the identifier, and forward the outgoing communication message to the second target device.

14. The wearable device according to claim 13, wherein the one or more programs comprise instructions used for performing the following operations:

establishing a communication connection to the transfer device, before receiving the incoming communication message sent by the transfer device, or before sending the outgoing communication message and the identifier to the transfer device; and receiving a user account sent by the transfer device by means of the communication connection, and logging in the user account to the wearable device, wherein the user account is an account used for performing communication by another device.

15. The wearable device according to claim 13, wherein when the identifier is a contact account, the one or more programs comprise instructions used for performing the following operations:

displaying contact accounts of target devices stored in the wearable device, receiving an account selection instruction, and determining a contact account returned in response to the account selection instruction as a contact account of the second target device; or receiving input contact information, and detecting whether the wearable device stores a contact account that matches the contact information; when the wearable device stores the contact account that matches the contact information, determining the contact account as a contact account of the second target device; or when the wearable device does not store the contact account that matches the contact information, sending the contact information to the transfer device, receiving the contact account that matches the contact information and that is sent by the transfer device, and determining the contact account as a contact account of the second target device.

16. The wearable device according to claim 13, wherein the one or more programs comprise instructions used for performing the following operations:

detecting a voice reply instruction triggered by a user;

receiving an input voice message, the input voice message being the outgoing communication message or the voice reply message input by the user for the incoming communication message.

17. A transfer device, comprising:

one or more processors; and a memory, wherein the memory stores one or more programs, wherein the one or more programs are configured to be executed by the one or more processors, and the one or more programs comprise instructions used for performing the following operations:

setting an application list in the transfer device storing at least one predetermined service application, wherein the application list comprises a navigation application;

determining the transfer device meets a predetermined condition when the transfer device is running the navigation application in a lock screen status;

when the transfer device is in the lock screen status, receiving a communication message sent by a target device;

detecting whether the transfer device meets the predetermined condition;

forwarding the communication message to a wearable device when the transfer device meets the predetermined condition; and receiving a voice reply message sent by the wearable device without changing the lock screen status of the transfer device, and forwarding the voice reply message to the target device, wherein the voice reply message is input to the wearable device for the communication message.

18. The transfer device according to claim 17, wherein the one or more programs comprise instructions used for performing the following operations:

detecting, whether an interface currently displayed by the transfer device is a display interface of the communication message; or detecting whether an interface currently displayed by the transfer device is a display interface of a social application corresponding to the communication message; or detecting, whether the transfer device is currently in the lock screen status, and detecting whether a control switch in the transfer device is in a predetermined status, wherein the predetermined status is used for indicating that the transfer device is allowed to send the communication message to the wearable device; or detecting whether the transfer device receives, within a first time period, a first historical message sent by the wearable device, wherein an end moment of the first time period is a moment at which the transfer device receives the communication message, and the first historical message is a historical voice reply message obtained by the wearable device according to a communication message received at a historical moment, or the first historical message is a communication message sent by the wearable device at the historical moment; or detecting whether the transfer device sends a second historical message to the wearable device within a second time period, wherein an end moment of the second time period is a moment at which the transfer device receives the communication message, and the second historical message is a communication message received by the wearable device at the historical moment; or detecting whether the transfer device is running the at least one predetermined service application.

19. The method according to claim 1, wherein when detecting the transfer device is in the lock screen status, the transfer device further reads a status of a control switch; and the method further comprises:

when the transfer device is in the lock screen status and the control switch in the transfer device is in a disabled status, determining that the transfer device does not meet the predetermined condition.

20. The wearable device according to claim 9, wherein when detecting the transfer device is in the lock screen status, the transfer device further reads a status of a control switch; and when the transfer device is in the lock screen status and the control switch in the transfer device is in a disabled status, the transfer device is determined as not meeting the predetermined condition.

* * * * *